(12) United States Patent
Zhang

(10) Patent No.: US 12,245,060 B2
(45) Date of Patent: Mar. 4, 2025

(54) METHOD AND DEVICE IN NODES USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 426 days.

(21) Appl. No.: 17/578,472

(22) Filed: Jan. 19, 2022

(65) Prior Publication Data

US 2022/0240112 A1  Jul. 28, 2022

(30) Foreign Application Priority Data

Jan. 22, 2021  (CN) .......................... 202110086846.1

(51) Int. Cl.
*H04W 24/08* (2009.01)
*H04L 1/00* (2006.01)
*H04W 72/0446* (2023.01)
*H04W 72/0453* (2023.01)
*H04W 72/51* (2023.01)

(52) U.S. Cl.
CPC .......... *H04W 24/08* (2013.01); *H04L 1/0038* (2013.01); *H04W 72/0446* (2013.01); *H04W 72/0453* (2013.01); *H04W 72/51* (2023.01)

(58) Field of Classification Search
CPC ............. H04W 24/08; H04W 72/0446; H04W 72/0453; H04W 72/51; H04W 72/23; H04L 1/0038; H04L 5/0053; H04L 5/0094
See application file for complete search history.

(56) References Cited

U.S. PATENT DOCUMENTS

| | | | | |
|---|---|---|---|---|
| 2020/0204294 | A1* | 6/2020 | Ma | H04L 1/0038 |
| 2020/0280994 | A1* | 9/2020 | Liu | H04W 72/0446 |
| 2021/0250153 | A1* | 8/2021 | Lin | H04W 72/23 |
| 2024/0008009 | A1* | 1/2024 | Ren | H04W 72/0446 |

FOREIGN PATENT DOCUMENTS

| | | | |
|---|---|---|---|
| KR | 20220102611 A | * | 7/2022 |
| WO | WO-2022082709 A1 | * | 4/2022 |

* cited by examiner

*Primary Examiner* — Austin J Moreau

(57) ABSTRACT

The present disclosure provides a method and device in nodes used for wireless communication. A first node receives a first information block and a second information block, and the first information block and the second information block are respectively used to indicate a first control channel candidate set and a second control channel candidate set; time-frequency resources occupied by the first control channel candidate set belong to a first time-frequency resource set, and time-frequency resources occupied by the second control channel candidate set belong to a second time-frequency resource set; the first node monitors Q1 control channel candidates; wherein a first time-frequency resource set belongs to a first time window in time domain The method of the application is conducive to improving a number of blind detections of a control channel and increasing the flexibility of the blind detection capability allocation.

20 Claims, 7 Drawing Sheets

| First time length | Maximum monitoring number |
|---|---|
| L0 | $a_0$ |
| L1 | $a_1$ |
| L2 | $a_2$ |
| L3 | $a_3$ |
FIG. 9
| First time length | Second monitoring number component |
|---|---|
| L0 | $b_0$ |
| L1 | $b_1$ |
| L2 | $b_2$ |
| L3 | $b_3$ |
FIG. 10
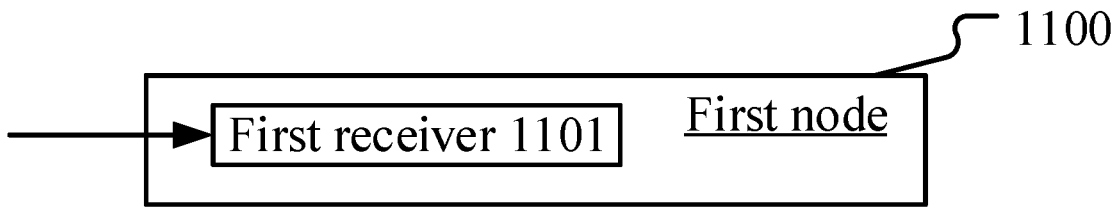
FIG. 11
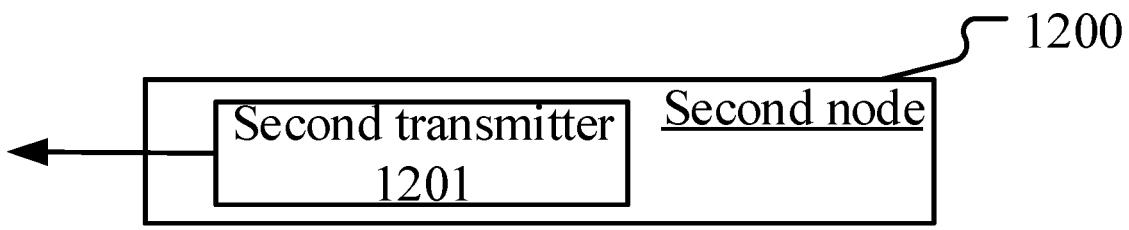
FIG. 12

METHOD AND DEVICE IN NODES USED FOR WIRELESS COMMUNICATION

CROSS REFERENCE TO RELATED APPLICATIONS

This application claims the priority benefit of Chinese Patent Application No. 202110086846.1, filed on Jan. 22, 2021, the full disclosure of which is incorporated herein by reference.

BACKGROUND

Technical Field

The present disclosure relates to transmission methods and devices in wireless communication systems, and in particular to a transmission scheme and device of a control channel in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at the 3GPP RAN #75th plenary to standardize NR.

In NR technology, extending NR to a spectrum with a higher frequency is an important topic. In order to adapt to more diverse application scenarios to meet higher requirements, a WI of extending NR system to a spectrum between 52.6 GHz and 71 GHz was approved in 3GPP RAN #86 plenary. In order to support a larger bandwidth and resist more serious phase noise, a larger subcarrier spacing (SCS), such as 480 KHz and 960 KHz, is supported at 52.6 GHz and 71 GHz. In this case, corresponding to a 120 KHz or smaller SCS, a length of an Orthogonal Frequency Divided Multiplexing (OFDM) symbol will become shorter, and accordingly, a slot interval will become shorter.

In NR system, a User Equipment (UE) is configured with one or a plurality of UE-specific Search Space Sets (USS sets) and Common Search Space sets (CSS set). Each USS set or CSS set comprises a group of Physical Downlink Control Channel (PDCCH) candidates. A UE needs to perform a blind detection on the USS set or the CSS set to determine whether there is a PDCCH being transmitted to itself.

SUMMARY

Inventors found through researches that the use of a wider SCS will shorten the OFDM symbol length and the slot length, and the UE needs to perform PDCCH blind detections more quickly and frequently, which results in higher implementation complexity of the UE and consumes more energy, thus being not conducive to controlling the cost and energy consumption of the UE.

To address the above problem, the present disclosure provides a solution. It should be noted that in the description of the present disclosure, although the above description takes the scenario of radio transmission between a cellular network gNB (next generation Node B) and a UE as an example, the present disclosure is also applicable to other communication scenarios (such as Wireless Local Area Network (WLAN), sidelink transmission between UEs), where similar technical effects are achieved. Additionally, the adoption of a unified solution for various scenarios, including but not limited to cellular networks, WLAN, sidelink transmission, contributes to the reduction of hardcore complexity and costs. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and monitoring Q1 control channel candidates, Q1 being an integer greater than 1;

herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, characteristics of the above method include: the maximum monitoring number comprises a maximum value of PDCCH blind detection times supported by the UE within the first time window, and the first time window comprises a time length of at least one slot.

In one embodiment, advantages of the above method include: the maximum monitoring number is defined within a first time window, and the first time window is greater than a time length of a slot; the UE can perform a blind detection of the PDCCH within a first time window, therefore compared with a PDCCH monitoring based on a slot or less than a slot, the UE can support more blind detection times under the same signal processing capability.

In one embodiment, characteristics of the above method include: the first time-frequency resource set is located within a first slot in the first time window.

In one embodiment, characteristics of the above method include: the first control channel candidate set comprises at least one USS set.

In one embodiment, characteristics of the above method include: the UE assumes that only one slot in a first time window is configured with a USS set.

In one embodiment, advantages of the above method include: a first time window comprises a plurality of slots, and the UE only needs to perform a monitoring of a USS set in one of the plurality of slots, which reduces the complexity of the UE and is conducive to energy saving of the UE.

In one embodiment, characteristics of the above method include: the second time-frequency resource set is located within one of the plurality of slots after a first slot in the first time window.

In one embodiment, characteristics of the above method include: the second control channel candidate set comprises at least one CSS set.

In one embodiment, advantages of the above method include: a first time window comprises a plurality of slots, a CSS set can be configured within a slot other than a first slot within a first time window without limitation; since the CSS set comprises groupcast or broadcast control signalings, the above method is conducive to improving flexibility of the CSS set configuration, so that different UEs can monitor the CSS set in a same PDCCH monitoring occasion.

In one embodiment, advantages of the above method include: the first time-frequency resource set is located before the second time-frequency resource set in time domain; therefore, a UE starts monitoring the first control channel candidate set, and then starts monitoring the second control channel candidate set. Due to the sequential relation of the signal processing, when the UE starts monitoring the second control channel candidate set, part of computing resources for monitoring the first control channel candidate set (such as: storage space, processing process, etc.) has been released, these released computing resources can be re-used to monitor the second control channel candidate set. When the first time length is large, more computing resources will be released, so a maximum monitoring number that the UE can support within the first time window can also be more; conversely, when the first time length is small, a maximum monitoring number that the UE can support in the first time window will also be less. The computing resources can be more fully utilized by adopting the above method, so that the UE can support more blind detection numbers of PDCCH candidates.

According to one aspect of the present disclosure, the above method is characterized in that the maximum monitoring number comprises a first monitoring number component and a second monitoring number component, the first monitoring number component is unrelated to the first time length, and the first time length is used to determine the second monitoring number component.

In one embodiment, characteristics of the above method include: the first monitoring number component is determined by a maximum PDCCH blind detection capability of the UE; the second monitoring number component is determined by a blind detection capacity that can be released or reused by the UE after a first time length. Therefore, a first monitoring component is unrelated to a first time length, and a second monitoring component is related to a first time length.

In one embodiment, characteristics of the above method include: a PDCCH monitoring capability represented by the first monitoring number component can be used for monitoring on the first control channel candidate set and the second control channel candidate set.

In one embodiment, characteristics of the above method include: a PDCCH monitoring capability represented by the second monitoring number component is only used for a monitoring on the second control channel candidate set instead of for a monitoring on the first control channel candidate set.

In one embodiment, advantages of the above method include: by dividing a maximum monitoring number into a first monitoring number component and a second monitoring number component, the PDCCH monitoring capability can be more accurately allocated to the first control channel candidate and the second control channel candidate set.

According to one aspect of the present disclosure, the above method is characterized in comprising:
transmitting a third information block;
herein, the third information block is used to determine that the first node has a capability to determine the maximum monitoring number according to both the first time length and a time length of the first time window.

According to one aspect of the present disclosure, the above method is characterized in that the third information block is used to determine a plurality of monitoring capability candidates supported by the first node, and the second monitoring number component is one of the plurality of monitoring capability candidates.

According to one aspect of the present disclosure, the above method is characterized in that when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

According to one aspect of the present disclosure, the above method is characterized in that any control channel candidate in the second control channel candidate set belongs to a common search space set.

According to one aspect of the present disclosure, the above method is characterized in comprising:
receiving a fourth information block;
herein, the fourth information block indicates a third control channel candidate set, and the third control channel candidate set comprises at least one control channel candidate; time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

In one embodiment, characteristics of the above method include: the third control channel candidate set comprises a CSS set.

In one embodiment, advantages of the above method include: when there exist two CSS sets after a first control channel candidate set, both the two CSS sets are located within a first time window, and when the two CSS sets are respectively different from two time intervals between the first control channel candidate sets, only a smaller one of the above two time intervals is used as a basis for judging the maximum monitoring number, which can simplify the complexity of determining the maximum monitoring number.

The present disclosure provides a method in a second node for wireless communications, comprising:

transmitting a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and determining Q1 control channel candidates, Q1 being an integer greater than 1;

herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

According to one aspect of the present disclosure, the above method is characterized in that the maximum monitoring number comprises a first monitoring number component and a second monitoring number component, the first monitoring number component is unrelated to the first time length, and the first time length is used to determine the second monitoring number component.

According to one aspect of the present disclosure, the above method is characterized in comprising:

receiving a third information block;

herein, the third information block is used to determine that the first node has a capability to determine the maximum monitoring number according to both the first time length and a time length of the first time window.

According to one aspect of the present disclosure, the above method is characterized in that the third information block is used to determine a plurality of monitoring capability candidates supported by a transmitting node of the third information block, and the second monitoring number component is one of the plurality of monitoring capability candidates.

According to one aspect of the present disclosure, the above method is characterized in that when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

According to one aspect of the present disclosure, the above method is characterized in that any control channel candidate in the second control channel candidate set belongs to a common search space set.

According to one aspect of the present disclosure, the above method is characterized in comprising:

transmitting a fourth information block;

herein, the fourth information block indicates a third control channel candidate set, and the third control channel candidate set comprises at least one control channel candidate; time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

The present disclosure provides a first node for wireless communications, comprising:

a first receiver, receiving a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and the first receiver, monitoring Q1 control channel candidates, Q1 being an integer greater than 1;

herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

The present disclosure provides a second node for wireless communications, comprising:

a second transmitter, transmitting a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and the second transmitter, determining Q1 control channel candidates, Q1 being an integer greater than 1;

herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the method in the present disclosure is advantageous in the following aspects:

the blind detection capability of a PDCCH can be defined within a time length of a plurality of slots, compared with PDCCH monitoring of an interval based on a slot or less than a slot, the UE can support more blind detection times under the same signal processing capability;

for a time window comprising a plurality of slots, the UE only needs to perform monitoring of a USS in a slot without monitoring a USS in other slots, which reduces the complexity of the UE and is conducive to UE energy saving;

for a time window comprising a plurality of slots, a CSS set can be configured in any slot without limitation, which is conducive to improving flexibility of the CSS set configuration;

while reducing the complexity of the UE PDCCH blind detection, the released computing resources of the UE are fully utilized to enable the UE to support more blind detection numbers of the PDCCH candidates.

the maximum number of PDCCH blind detections is divided into 2 components, which respectively reflect the maximum monitoring capability of the UE and the capability to recycle the released computing resources, and the PDCCH monitoring capability can be more accurately allocated to a PDCCH candidate set of a first slot located within a first time window and a PDCCH candidate set of a first slot located out of a first time window;

when there exists a plurality of CSS sets located out of a first slot of a first time window, only a PDCCH candidate set closer to the first slot of the first time window is used as a basis for judging the maximum PDCCH blind detection number, which can simplify the complexity of determining a maximum PDCCH blind detection number.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of a first time length and a maximum monitoring number according to one embodiment of the present disclosure;

FIG. 10 illustrates a schematic diagram of a first time length and a second monitoring number component according to one embodiment of the present disclosure;

FIG. 11 illustrates a structure block diagram of a processing device in first node according to one embodiment of the present disclosure;

FIG. 12 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
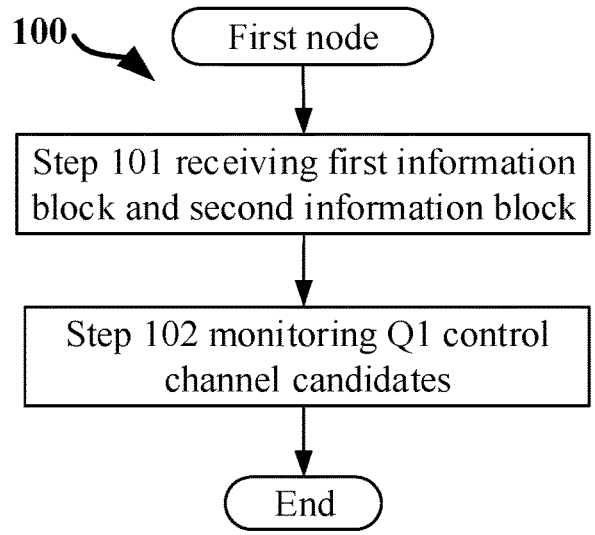
FIG. 1 illustrates a flowchart of the processing of a first node according to one embodiment of the present disclosure.

Embodiment 1 illustrates a flowchart of the processing of a first node according to one embodiment of the present disclosure, as shown in FIG. 1. In FIG. 1, each box represents a step. Particularly, the sequential order of steps in these boxes does not necessarily mean that the steps are chronologically arranged.

In embodiment 1, a first node in the present disclosure receives a first information block and a second information block in step 101, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and the first node in the present disclosure monitors Q1 control channel candidates in step 102, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the first information block is transmitted through an air interface.

In one embodiment, the first information block is transmitted through a radio interface.

In one embodiment, the first information block comprises all or part of a higher-layer signaling.

In one embodiment, the first information block comprises all or part of a physical-layer signaling.

In one embodiment, the first information block comprises all or part of a Radio Resource Control (RRC) signaling.

In one embodiment, the first information block comprises all or part of a Medium Access Control (MAC) layer signaling.

In one embodiment, the first information block comprises all or part of a System Information Block (SIB).

In one embodiment, the first information block is Cell-specific.

In one embodiment, the first information block is UE-specific.

In one embodiment, the first information block is Per Serving Cell configured.

In one embodiment, the first information block comprises all or part of fields of a Downlink Control Information (DCI) signaling.

In one embodiment, the first information block comprises more than one sub-information block, and each sub-information block comprised in the first information block is an IE or a field in an RRC signaling to which the first information block belongs; a sub-information block comprised in the first information block is used to indicate the first control channel candidate set.

In one embodiment, the first information block comprises all or partial fields in an IE "BWP-Downlink" in an RRC signaling.

In one embodiment, the first information block comprises all or partial fields in an IE "BWP-DownlinkDedicated" in an RRC signaling.

In one embodiment, the first information block comprises all or partial fields in an IE "PDCCH-Config" in an RRC signaling.

In one embodiment, the first information block comprises all or partial fields in an IE "ControlResourceSet" in an RRC signaling.

In one embodiment, the first information block comprises all or partial fields in an IE "SearchSpace" in an RRC signaling.

In one embodiment, the first information block comprises a field "searchSpacesToAddModList" in an RRC signaling.

In one embodiment, an expression of "the first information block being used to indicate a first control channel candidate set" in the claim includes the following meaning: the first information block is used to explicitly indicate a first control channel candidate set.

In one embodiment, an expression of "the first information block being used to indicate a first control channel candidate set" in the claim includes the following meaning: the first information block is used to implicitly indicate a first control channel candidate set.

In one embodiment, an expression of "the first information block being used to indicate a first control channel candidate set" in the claim includes the following meaning: the first information block is used to indicate at least one search space set, any search space set in the at least one search space set comprises at least one control channel candidate, and the first control channel candidate set comprises the at least one search space set.

In one embodiment, an expression of "the first information block being used to indicate a first control channel candidate set" in the claim includes the following meaning: the first information block is used to indicate a Control Resource Set (CORESET) associated with at least one search space set comprised in the first control channel candidate set.

In one embodiment, the first information block comprises a first field, the first field is a field comprised in an IE "SearchSpace" in an RRC signaling, and the first field indicates a search space ID.

In one embodiment, the first information block comprises a first field, the first field is a field comprised in an IE "SearchSpace" in an RRC signaling, and the first field indicates a CORESET ID.

In one embodiment, the first information block comprises a first field, the first field is a field comprised in an IE in an RRC signaling, and the first field indicates a plurality of search space IDs.

In one embodiment, an expression of "the first information block being used to indicate a first control channel candidate set" in the claim includes the following meaning: the first information block comprises a first field, the first field is a field comprised in an IE in an RRC signaling, and the first field indicates a search space ID; the first control channel candidate set comprises a search space set represented by the search space ID indicated by the first field.

In one embodiment, the first information block indicates at least one USS set.

In one embodiment, the second information block is transmitted via an air interface.

In one embodiment, the second information block is transmitted via a radio interface.

In one embodiment, the second information block comprises all or part of a higher-layer signaling.

In one embodiment, the second information block comprises all or part of a physical-layer signaling.

In one embodiment, the second information block comprises all or part of an RRC signaling.

In one embodiment, the second information block comprises all or part of a MAC layer signaling.

In one embodiment, the second information block comprises all or part of an SIB.

In one embodiment, the second information block is Cell-specific.

In one embodiment, the second information block is UE-specific.

In one embodiment, the second information block is Per Serving Cell configured.

In one embodiment, the second information block comprises all or partial fields of a DCI signaling.

In one embodiment, the second information block comprises more than one sub-information block, and each sub-information block comprised in the second information block is an IE or a field in an RRC signaling to which the second information block belongs; a sub-information block comprised in the second information block is used to indicate the second control channel candidate set.

In one embodiment, the second information block comprises all or partial fields in an IE "BWP-Downlink" in an RRC signaling.

In one embodiment, the second information block comprises all or partial fields in an IE "BWP-DownlinkDedicated" in an RRC signaling.

In one embodiment, the second information block comprises all or part of fields in an IE "PDCCH-Config" in an RRC signaling.

In one embodiment, the second information block comprises all or partial fields in an IE "ControlResourceSet" in an RRC signaling.

In one embodiment, the second information block comprises all or partial fields in an IE "SearchSpace" in an RRC signaling.

In one embodiment, the second information block comprises a field "searchSpacesToAddModList" in an RRC signaling.

In one embodiment, an expression of "the second information block being used to indicate a second control channel candidate set" in the claim includes the following meaning: the second information block is used to explicitly indicate a second control channel candidate set.

In one embodiment, an expression of "the second information block being used to indicate a second control channel candidate set" in the claim includes the following meaning: the second information block is used to implicitly indicate a second control channel candidate set.

In one embodiment, an expression of "the second information block being used to indicate a second control channel candidate set" in the claim includes the following meaning: the second information block is used to indicate at least one search space set, any search space set in the at least one search space set comprises at least one control channel candidate, and the second control channel candidate set comprises the at least one search space set.

In one embodiment, an expression of "the second information block being used to indicate a second control channel candidate set" in the claim includes the following meaning: the second information block is used to indicate a CORESET associated with at least one search space set comprised in the second control channel candidate set.

In one embodiment, the second information block comprises a second field, the second field is a field comprised in an IE "SearchSpace" in an RRC signaling, and the second field indicates a search space ID.

In one embodiment, the second information block comprises a second field, the second field is a field comprised in an IE "SearchSpace" in an RRC signaling, and the second field indicates a CORESET ID.

In one embodiment, the second information block comprises a second field, the second field is a field comprised in an IE in an RRC signaling, and the second field indicates a plurality of search space IDs.

In one embodiment, an expression of "the second information block being used to indicate a second control channel candidate set" in the claim includes the following meaning: the second information block comprises a second field, the second field is a field comprised in an IE in an RRC signaling, and the second field indicates a search space ID; the second control channel candidate set comprises a search space set represented by the search space ID indicated by the second field.

In one embodiment, the second information block is used to configure at least one CSS set.

In one embodiment, the first information block and the second information block respectively belong to two different RRC layer signalings.

In one embodiment, the first information block and the second information block are two different IEs comprised in a same RRC layer signaling.

In one embodiment, the first information block and the second information block belong to a same RRC layer signaling, and a field comprised in the first information block and a field comprised in the second information block are different.

In one embodiment, the first information block and the second information block are transmitted at the same time.

In one embodiment, the first information block is earlier than the second information block.

In one embodiment, the first information block is later than the second information block.

In one embodiment, the control channel candidate is a PDCCH candidate.

In one embodiment, the control channel candidate is a Physical Uplink Control Channel (PUCCH) candidate.

In one embodiment, the control channel candidate is a Physical Sidelink Control Channel (PSCCH) candidate.

In one embodiment, Q1 is monitoring times used by the first node in the present disclosure for the first control channel candidate set and the second control channel candidate set when calculating the total monitoring times.

In one embodiment, Q1 is monitoring times used by the second node in the present disclosure for the first control channel candidate set and the second control channel candidate set when calculating the total monitoring times.

In one embodiment, the phrase of "monitoring Q1 control channel candidates" includes: performing decoding on the Q1 control channel candidates.

In one embodiment, the phrase of "monitoring Q1 control channel candidates" includes: performing blind decoding on the Q1 control channel candidates.

In one embodiment, the phrase of "monitoring Q1 control channel candidates" includes: performing decoding and CRC check on the Q1 control channel candidates.

In one embodiment, the phrase of "monitoring Q1 control channel candidates" includes: performing decoding and a CRC check scrambled by an RNTI on the Q1 control channel candidates.

In one embodiment, the phrase of "monitoring Q1 control channel candidates" includes: performing decoding on the Q1 control channel candidates based on the monitored one or a plurality of DCI formats.

In one embodiment, a number of CCEs occupied by any of the Q1 control channel candidates is equal to one of 1, 2, 4, 8, 16 and 32.

In one embodiment, any of the Q1 control channel candidates is a PDCCH candidate.

In one embodiment, any of the Q1 control channel candidates is a monitored PDCCH candidate.

In one embodiment, any of the Q1 control channel candidates is a PDCCH candidate adopting one or more DCI formats.

In one embodiment, any of the Q1 control channel candidates is a PDCCH candidate adopting one or a plurality of DCI payload sizes.

In one embodiment, any of the Q1 control channel candidates is a time-frequency resource set carrying specific DCI with one or more formats.

In one embodiment, any two of the Q1 control channel candidates are different.

In one embodiment, there exist two control channel candidates in the Q1 control channel candidates being the same.

In one embodiment, the Q1 control channel candidates comprise two control channel candidates occupying same time-frequency resources.

In one embodiment, CCEs occupied by any two of the Q1 control channel candidates are different.

In one embodiment, there exist two control channel candidates in the Q1 control channel candidates occupying same CCE sets.

In one embodiment, there exist two control channel candidates in the Q1 control channel candidates occupying partially overlapped CCE sets.

In one embodiment, characteristic attributes of any two of the Q1 control channel candidates are different, and the characteristic attributes comprise at least one of an occupied CCE, adopted scrambling, or a corresponding DCI payload size.

In one embodiment, there exist occupied CCEs, adopted scrambling and corresponding DCI payload sizes of two of the Q1 control channel candidates being the same.

In one embodiment, there exist two control channel candidates in the Q1 control channel candidates respectively belonging to two search space sets.

In one embodiment, all of the Q1 control channel candidates belong to a same search space set.

In one embodiment, the first control channel candidate set and the second control channel candidate set are different.

In one embodiment, any CCE occupied by any control channel candidate in the first control channel candidate set and any CCE occupied by any control channel candidate in the second control channel candidate set are Time Division Multiplexing (TDM).

In one embodiment, any CCE occupied by any control channel candidate in the first control channel candidate set and any CCE occupied by any control channel candidate in the second control channel candidate set are orthogonal in time-frequency domain.

In one embodiment, any CCE occupied by any control channel candidate in the first control channel candidate set and any CCE occupied by any control channel candidate in the second control channel candidate set are non-overlapped or not fully overlapped in time-frequency domain.

In one embodiment, an index of any control channel candidate in the first control channel candidate set in a search space set to which it belongs and an index of any control channel candidate in the second control channel candidate set in a search space to which it belongs are unequal.

In one embodiment, an index of a CORESET associated with a search space set to which any control channel candidate in the first control channel candidate set belongs and an index of a CORESET associated with a search space set to which any control channel candidate in the second control channel candidate set belongs are unequal.

In one embodiment, a scrambling adopted by any control channel candidate in the first control channel candidate set and a scrambling adopted by any control channel candidate in the second control channel candidate set are different.

In one embodiment, a CORESET Pool Index to which a CORESET associated with a search space set to which any control channel candidate in the first control channel candidate set belongs and a CORESET Pool Index of a CORESET associated with a search space set to which any control channel candidate in the second control channel candidate set belongs are unequal.

In one embodiment, a number of CCEs occupied by any control channel candidate in the first control channel candidate set is equal to an aggregation level of any control channel candidate in the first control channel candidate set.

In one embodiment, a number of CCEs occupied by any control channel candidate in the second control channel candidate set is equal to an aggregation level of any control channel candidate in the second control channel candidate set.

In one embodiment, a number of CCEs occupied by any control channel candidate in the first control channel candidate set is equal to 1, 2, 4, 8, 16 and 32, and a number of CCEs occupied by any control channel candidate in the second control channel set is equal to 1, 2, 4, 8, 16 and 32.

In one embodiment, a number of CCEs occupied by any control channel candidate in the first control channel candidate set and a number of CCEs occupied by any control channel candidate in the second control channel candidate set both belong to a number value in a first number set, the first number set comprises at least one number value, and the first number set is predefined or configurable.

In one embodiment, the first time-frequency resource set comprises at least one Resource Element (RE) in frequency domain.

In one embodiment, the first time-frequency resource set comprises at least one Resource Block (RB) in frequency domain.

In one embodiment, the first time-frequency resource set comprises at least one Resource Block Group (RBG) in frequency domain.

In one embodiment, the first time-frequency resource set comprises at least one Control Channel Element (CCE) in frequency domain.

In one embodiment, the first time-frequency resource set comprises at least one multicarrier symbol in time domain.

In one embodiment, the first time-frequency resource set comprises at least one slot in time domain.

In one embodiment, the first time-frequency resource set comprises at least one sub-frame in time domain.

In one embodiment, the first time-frequency resource set comprises a plurality of consecutive multicarrier symbols in time domain.

In one embodiment, the first time-frequency resource set comprises a plurality of consecutive slots in time domain.

In one embodiment, the first time-frequency resource set comprises a plurality of consecutive resource blocks in frequency domain.

In one embodiment, the first time-frequency resource set comprises a plurality of inconsecutive resource blocks in frequency domain.

In one embodiment, the first time-frequency resource set comprises time-frequency resources comprised in a CORESET.

In one embodiment, the first time-frequency resource set comprises time-frequency resources comprised in a plurality of CORESETs.

In one embodiment, the first time-frequency resource set comprises time-frequency resources comprised in a plurality of CORESETs, and time-frequency resources comprised in the plurality of CORESETs are located in a same slot in time domain.

In one embodiment, the first time-frequency resource set comprises time-frequency resources comprised in a plurality of CORESETs, and time-frequency resources comprised in the plurality of CORESETs are located in consecutive plurality of slots in time domain.

In one embodiment, the first time-frequency resource set is located in one slot in the first time window in time domain.

In one embodiment, the first time-frequency resource set is located in a first slot in the first time window in time domain.

In one embodiment, the first time-frequency resource set is located in M1 consecutive slots in time domain in the first time window, M1 being an integer greater than 1.

In one embodiment, the first time-frequency resource set is located in first M1 consecutive slots in time domain in the first time window in time domain, M1 being an integer greater than 1.

In one embodiment, the first time-frequency resource set comprises frequency-domain resources occupied by all control channel candidates comprised in the first control channel candidate set in frequency domain.

In one embodiment, the first time-frequency resource set comprises time-domain resources occupied by all control channel candidates comprised in the first control channel candidate set in time domain.

In one embodiment, the first time-frequency resource set comprises multicarrier symbols occupied by all control channel candidates comprised in the first control channel candidate set in time domain.

In one embodiment, the first time-frequency resource set comprises a slot where all control channel candidates comprised in the first control channel candidate set are located in time domain.

In one embodiment, the second time-frequency resource set comprises at least one RE in frequency domain.

In one embodiment, the second time-frequency resource set comprises at least one RB in frequency domain.

In one embodiment, the second time-frequency resource set comprises at least one RBG in frequency domain.

In one embodiment, the second time-frequency resource set comprises at least one CCE in frequency domain.

In one embodiment, the second time-frequency resource set comprises at least one multicarrier symbol in time domain.

In one embodiment, the second time-frequency resource set comprises at least one slot in time domain.

In one embodiment, the second time-frequency resource set comprises at least one sub-frame in time domain.

In one embodiment, the second time-frequency resource set comprises a plurality of consecutive multicarrier symbols in time domain.

In one embodiment, the second time-frequency resource set comprises a plurality of consecutive slots in time domain.

In one embodiment, the second time-frequency resource set comprises a plurality of consecutive resource blocks in frequency domain.

In one embodiment, the second time-frequency resource set comprises a plurality of inconsecutive resource blocks in frequency domain.

In one embodiment, the second time-frequency resource set comprises time-frequency resources comprised in a CORESET.

In one embodiment, the second time-frequency resource set comprises time-frequency resources comprised in a plurality of CORESETs.

In one embodiment, the second time-frequency resource set comprises time-frequency resources comprised in a plurality of CORESETs, and time-frequency resources comprised in the plurality of CORESETs are located in a same slot in time domain.

In one embodiment, the second time-frequency resource set comprises time-frequency resources comprised in a plurality of CORESETs, and time-frequency resources comprised in the plurality of CORESETs are located in consecutive plurality of slots in time domain.

In one embodiment, the second time-frequency resource set comprises a slot in the first time window in time domain.

In one embodiment, the second time-frequency resource set comprises a slot other than a first slot in the first time window in time domain.

In one embodiment, the second time-frequency resource set comprises M1 consecutive slots in time domain in the first time window in time domain, M1 being an integer greater than 1.

In one embodiment, the second time-frequency resource set comprises M1 consecutive slots in time domain other than a first slot in the first time window in time domain, M1 being an integer greater than 1.

In one embodiment, the second time-frequency resource set comprises M1 consecutive slots in time domain other than first M3 slots in the first time window in time domain, M1 and M3 being integers greater than 1.

In one embodiment, the second time-frequency resource set comprises frequency-domain resources occupied by all control channel candidates comprised in the second control channel candidate set in frequency domain.

In one embodiment, the second time-frequency resource set comprises time-domain resources occupied by all control channel candidates comprised in the second control channel candidate set in time domain.

In one embodiment, the second time-frequency resource set comprises multicarrier symbols occupied by all control channel candidates comprised in the second control channel candidate set in time domain.

In one embodiment, the second time-frequency resource set comprises a slot where all control channel candidates comprised in the second control channel candidate set are located in time domain.

Embodiment 2

Figure 2:
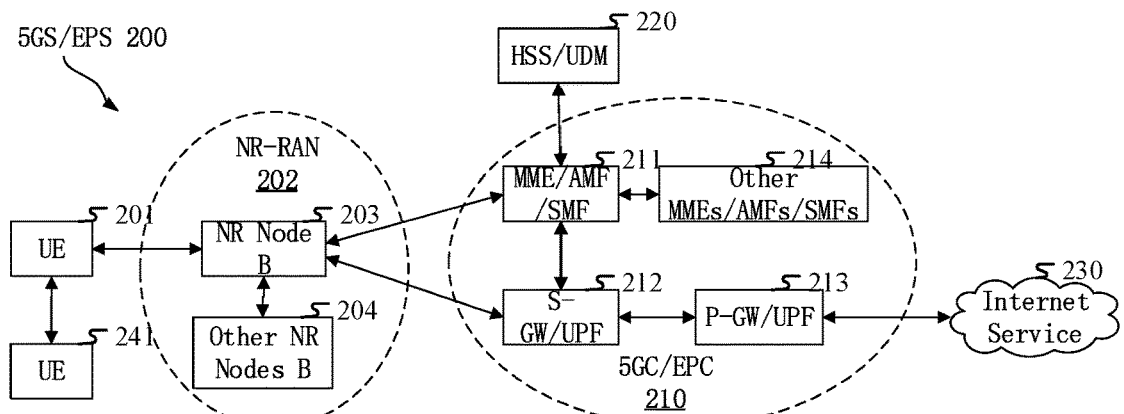
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LIE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the gNB 203.

In one embodiment, the second node in the present disclosure comprises the gNB 203.

In one embodiment, the second node in the present disclosure comprises the UE 241.

In one embodiment, the first node in the present disclosure comprises the UE 241.

In one embodiment, the second node in the present disclosure comprises the UE 201.

In one embodiment, the second node in the present disclosure comprises the gNB 204.

In one embodiment, the UE in the present disclosure comprises the UE 201.

In one embodiment, the UE in the present disclosure comprises the UE 241.

In one embodiment, the base station in the present disclosure comprises the gNB 203.

In one embodiment, the base station in the present disclosure comprises the gNB 203.

Embodiment 3

Figure 3:
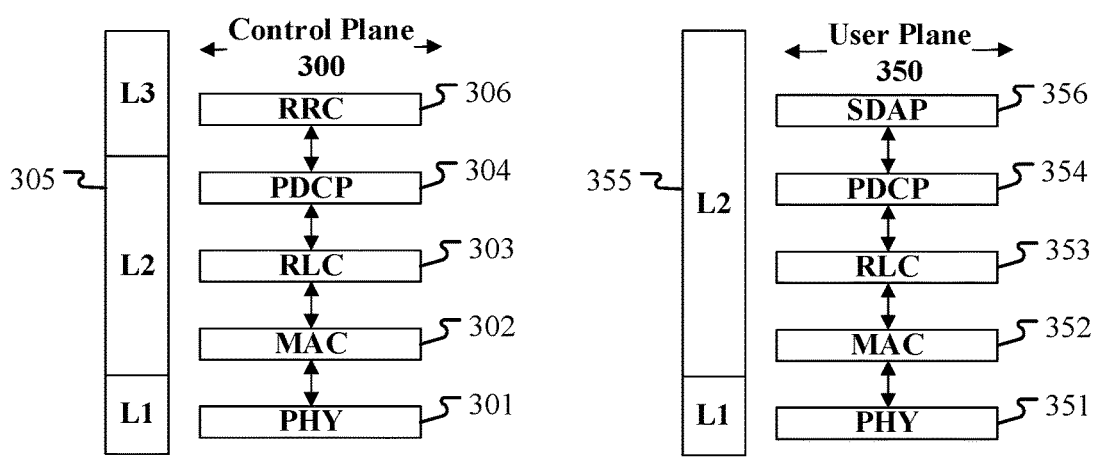
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a MAC sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 305, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC 306, or MAC 302, or MAC 352, or the PHY 301, or PHY 351.

In one embodiment, the second information block in the present disclosure is generated by the RRC 306, or MAC 302, or MAC 352, or the PHY 301, or PHY 351.

In one embodiment, the Q1 control channel candidates in the present disclosure are generated by the PHY 301 or the PHY 351.

In one embodiment, the third information block in the present disclosure is generated by the RRC 306, or MAC 302, or MAC 352, or the PHY 301, or PHY 351.

In one embodiment, the fourth information block in the present disclosure is generated by the RRC 306, or MAC 302, or MAC 352, or the PHY 301, or PHY 351.

Embodiment 4

Figure 4:
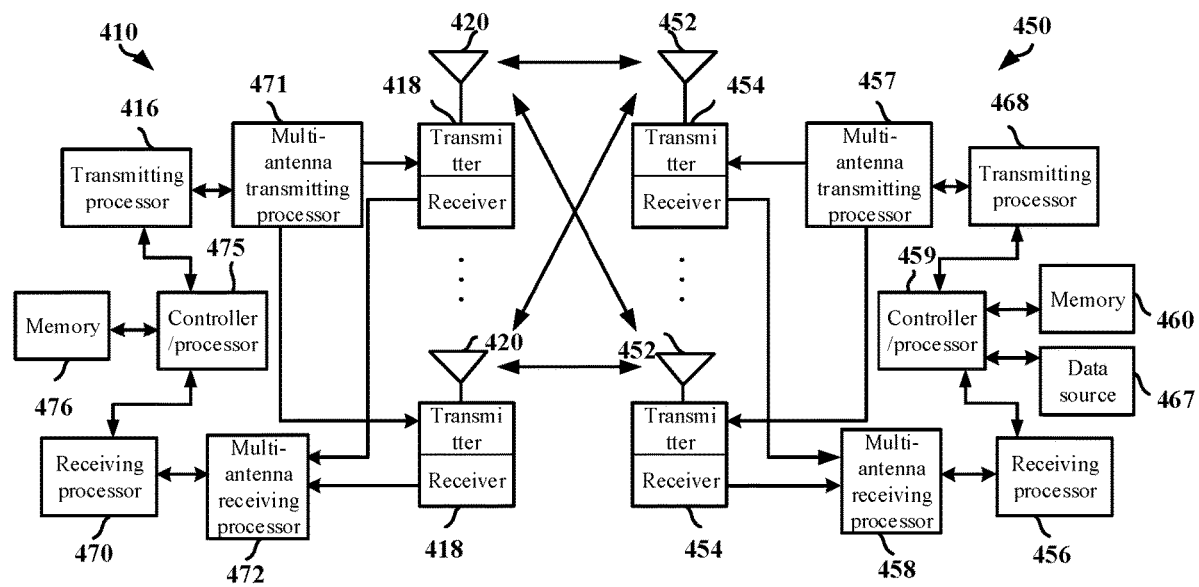
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 being in communications with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the second communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one embodiment, the first node in the present disclosure comprises the first communication device 410, and the second node in the present disclosure comprises the second communication node 450.

In one embodiment, the first node in the present disclosure comprises the second communication device 450, and the second node in the present disclosure comprises the second communication device 450.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information block and a second information block, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and monitors Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the second communication device 450 comprises a memory that stores a computer readable instruction program. The computer readable instruction program generates an action when executed by at least one processor. The action includes: receiving a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and monitoring Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first information block and a second information block, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and determines Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the first communication device 410 comprises a memory that stores a computer readable instruction program. The computer readable instruction program generates an action when executed by at least one processor. The action includes: transmitting a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and determining Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, at least one of the antenna 452, the receiver 454, the multi-antenna receiving processor 458, the receiving processor 456, the controller/processor 459, the memory 460, or the data source 467 is used to receive the first information block in the present disclosure.

In one embodiment, at least one of the antenna 452, the receiver 454, the multi-antenna receiving processor 458, the receiving processor 456, the controller/processor 459, the memory 460, or the data source 467 is used to receive the second information block in the present disclosure.

In one embodiment, at least one of the antenna 452, the receiver 454, the multi-antenna receiving processor 458, the receiving processor 456, the controller/processor 459, the memory 460, or the data source 467 is used to receive the fourth information block in the present disclosure.

In one embodiment, at least one of the antenna 452, the transmitter 454, the multi-antenna transmitting processor 457, the transmitting processor 468, the controller/processor 459, the memory 460, or the data sources 467 is used to transmit the third information block in the present disclosure.

In one embodiment, at least one of the antenna 452, the receiver 454, the multi-antenna receiving processor 458, the receiving processor 456, the controller/processor 459, the memory 460, or the data source 467 is used to monitor the Q1 control channel candidates in the present disclosure.

In one embodiment, at least one of the antenna 420, the transmitter 418, the multi-antenna transmitting processor 471, the transmitting processor 416, the controller/processor 475, or the memory 476 is used to transmit the first information block in the present disclosure.

In one embodiment, at least one of the antenna 420, the transmitter 418, the multi-antenna transmitting processor 471, the transmitting processor 416, the controller/processor 475, or the memory 476 is used to transmit the second information block in the present disclosure.

In one embodiment, at least one of the antenna 420, the transmitter 418, the multi-antenna transmitting processor 471, the transmitting processor 416, the controller/processor 475, or the memory 476 is used to transmit the fourth information block in the present disclosure.

In one embodiment, at least one of the antenna 420, the receiver 418, the multi-antenna receiving processor 472, the receiving processor 470, the controller/processor 475, or the memory 476 is used to receive the third information block in the present disclosure.

Embodiment 5

Figure 5:
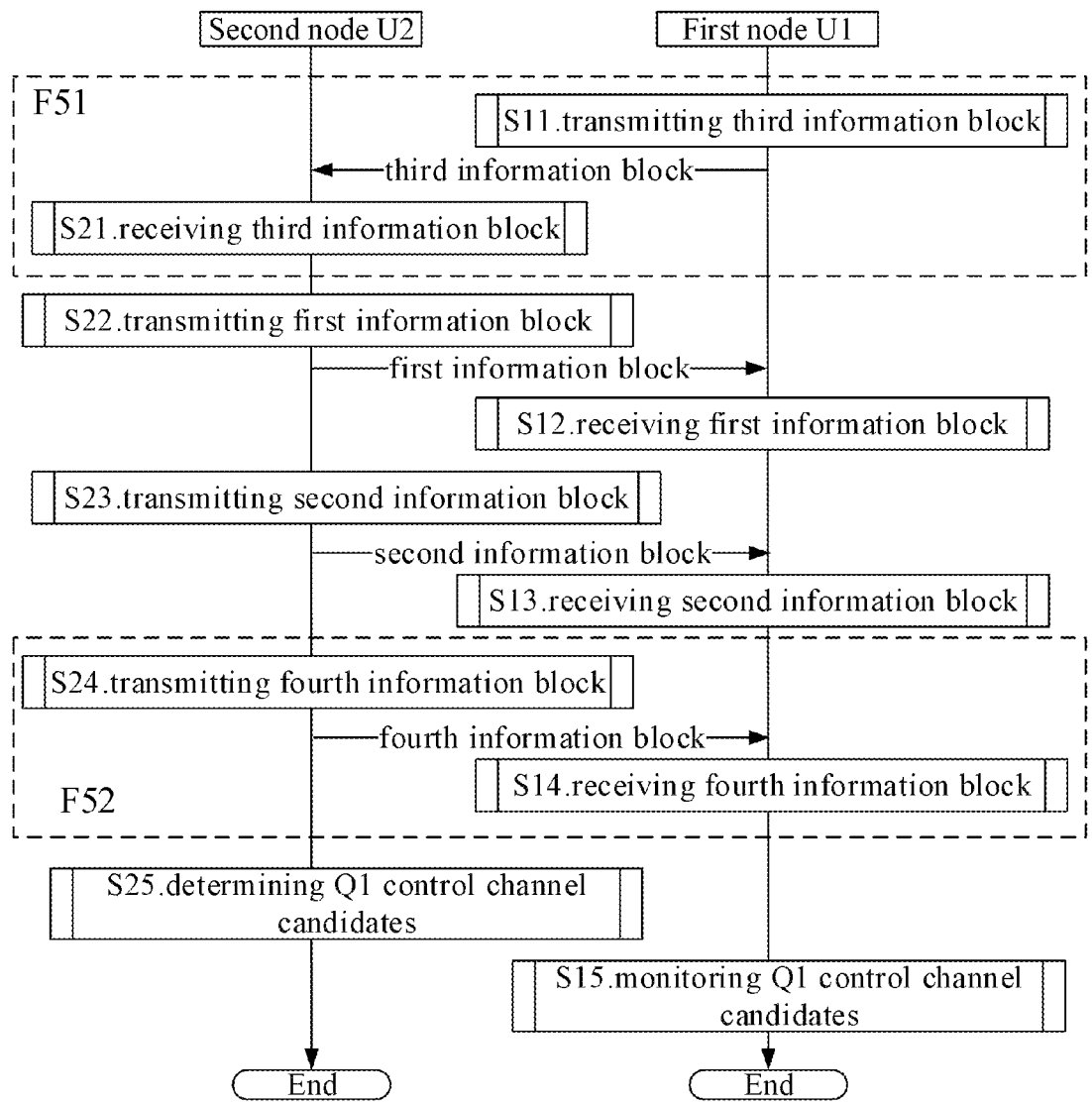
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U1 and a second node U2 are in communications via an air interface. In FIG. 5, the sequential order of steps in these boxes does not necessarily mean that the steps are chronologically arranged.

The first node U1 transmits a third information block in step S11, receives a first information block in step S12, receives a second information block in step S13, receives a fourth information block in step S14, and monitors Q1 control channel candidates in step S15. The second node U2 receives a third information block in step S21, transmits a first information block in step S22, transmits a second information block in step S23, transmits a fourth information block in step S24, and determines Q1 control channel candidates in step S25. Herein, steps S11 and S21 in dotted box F51 are optional, and steps S14 and S24 in dotted box F52 are optional.

In embodiment 5, the first node U1 receives a first information block and a second information block, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and the first node U1 monitors Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In embodiment 5, the second node U2 transmits a first information block and a second information block, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and the second node U2 determines Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, an air interface between the second node U2 and the first node U1 comprises a PC5 interface.

In one embodiment, an air interface between the second node U2 and the first node U1 comprises a sidelink.

In one embodiment, an air interface between the second node U2 and the first node U1 comprises a Uu interface.

In one embodiment, an air interface between the second node U2 and the first node U1 comprises a cellular link.

In one embodiment, an air interface between the second node U2 and the first node U1 comprises a radio interface between UEs.

In one embodiment, an air interface between the second node U2 and the first node U1 comprises a radio interface between a base station and a UE.

In one embodiment, the third information block is transmitted via an air interface.

In one embodiment, the third information block is transmitted via a radio interface.

In one embodiment, the third information block comprises all or part of a higher-layer signaling.

In one embodiment, the third information block comprises all or part of a physical-layer signaling.

In one embodiment, the third information block is earlier than the first information block.

In one embodiment, the third information block is later than the first information block.

In one embodiment, the third information block comprises all or part of an RRC signaling.

In one embodiment, the third information block comprises all or part of a MAC layer signaling.

In one embodiment, the third information block is transmitted through an Uplink Shared Channel (UL-SCH).

In one embodiment, the third information block is transmitted through a Physical Uplink Shared CHannel (PUSCH).

In one embodiment, the third information block is transmitted through a Physical Uplink Control Channel (PUCCH).

In one embodiment, the third information block comprises Uplink Control Information (UCI).

In one embodiment, the third information block is used to indicate a capability of the first node in the present disclosure.

In one embodiment, the third information block is used to determine that the first node has a capability to determine the maximum monitoring number according to both the first time length and a time length of the first time window.

In one embodiment, when the third information block comprises a first capability indication sub-field, the first node has a capability to determine the maximum monitoring number according to both the first time length and a time length of the first time window.

In one subembodiment of the above embodiment, whether the capability indication sub-field exists or not is used to indicate whether the first node has a capability to determine the maximum monitoring number according to both the first time length and a time length of the first time window.

In one embodiment, when the first capability indication sub-field is not transmitted, a maximum monitoring number supported by the first node is unrelated to the first time length.

In one embodiment, when the first capability indication sub-field is not transmitted, a maximum monitoring number supported by the first node only comprises the first monitoring number component.

In one embodiment, the third information block indicates that the first node supports determining the maximum monitoring number according to both the first time length and a time length of the first time window.

In one embodiment, the third information block indicates that the maximum monitoring number supported by the first node comprises the first monitoring number component and the second monitoring number component.

In one embodiment, the third information block can be used to indicate that the maximum monitoring number supported by the first node is unrelated to the first time length.

In one embodiment, the third information block can be used to indicate the maximum monitoring number supported by the first node only comprises the first monitoring number component.

In one embodiment, the capability to determine the maximum monitoring number according to both the first time length and a time length of the first time window includes: a maximum monitoring number supported by the first node can be calculated or obtained by table looking-up according to the first time length and a time length of the first time window.

In one embodiment, the capability to determine the maximum monitoring number according to both the first time length and a time length of the first time window includes: a maximum monitoring number supported by the first node comprises the first monitoring number component and the second monitoring number component.

In one embodiment, the third information block is used to determine a plurality of monitoring capability candidates supported by the first node, the maximum monitoring number is one of the plurality of monitoring capability candidates, and any of the plurality of monitoring capability candidates is a positive integer.

In one embodiment, the third information block is used to determine a plurality of monitoring capability candidates supported by the first node, and the second monitoring number component is one of the plurality of monitoring capability candidates, and any of the plurality of monitoring capability candidates is a positive integer.

In one embodiment, a time length of the first time window is one of M2 time window length candidates, M2 being an integer greater than 1.

In one subembodiment of the above embodiment, the third information block is used to indicate the M2 time window length candidates.

In one subembodiment of the above embodiment, the M2 time window length candidates are respectively associated with M2 monitoring capability candidates, and the maximum monitoring number is one of the M2 monitoring capability candidates, M2 being an integer greater than 1.

In one subembodiment of the above embodiment, the M2 time window length candidates are respectively associated with M2 monitoring capability candidate groups, and any of the M2 monitoring capability candidate groups comprises M2 monitoring capability candidates, M2 being a positive integer.

In one subembodiment of the above embodiment, the third information block is used to determine an association relation between M2 time window length candidates and the M2 monitoring capability candidates.

In one subembodiment of the above embodiment, the third information block is used to determine the M2 monitoring capability candidate groups.

In one subembodiment of the above embodiment, the M2 monitoring capability candidates are respectively associated with M2 first time lengths.

In one subembodiment of the above embodiment, the maximum monitoring number is one of the M2 monitoring capability candidates.

In one subembodiment of the above embodiment, the third information block is used to determine an association relation between M2 time window length candidates and the M2 monitoring capability candidate groups.

In one subembodiment of the above embodiment, the third information block is used to indicate an association relation between the M2 monitoring capability candidates and the M2 first time lengths.

In one embodiment, the maximum monitoring number is a maximum value that Q1 can reach.

In one embodiment, Q1 is not greater than the maximum monitoring number.

Embodiment 6

Figure 6:
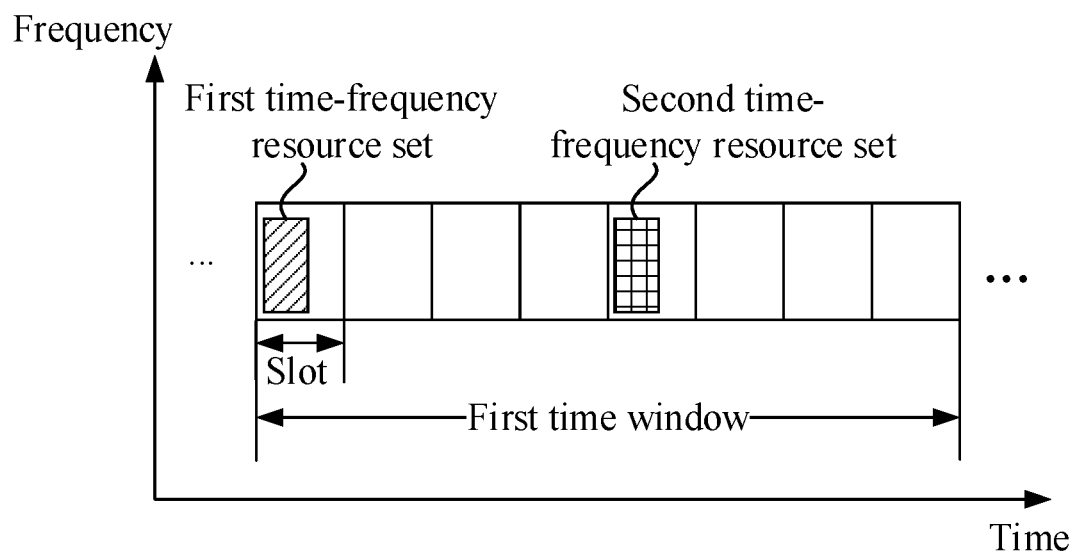
FIG. 6 illustrates a schematic diagram of time-frequency resources respectively comprised in a first time-frequency resource set and a second time-frequency resource set according to one embodiment of the present disclosure.

Embodiment 6 illustrates a schematic diagram of time-frequency resources respectively comprised in a first time-frequency resource set and a second time-frequency resource set according to one embodiment of the present disclosure, as shown in FIG. 6. In FIG. 6, the unfilled rectangle represents a time length of a slot in time domain and a section of frequency resources in frequency domain, the slash-filled rectangle represents time-frequency resources occupied by a first time-frequency resource set, and the grid-filled rectangle represents time-frequency resources occupied by a second time-frequency resource set. In FIG. 6, size and position of the rectangle are only for illustration instead of representing size of actual resources and that an occupation of resources is continuous. In embodiment 6, a first time window comprises a time length of 8 consecutive slots, the first time-frequency resource set is located in a first slot of the first time window in time domain, and the second time-frequency resource set is located in a fifth slot of the first time window in time domain.

In one embodiment, the slot is a slot defined by the 3GPP TS36 series protocol.

In one embodiment, the slot is a subframe defined by the 3GPP TS36 series protocol.

In one embodiment, the slot is a slot defined by the 3GPP TS38 series protocol.

In one embodiment, the slot is a mini-slot defined by the 3GPP TS38 series protocol.

In one embodiment, the slot is a subframe defined by the 3GPP TS38 series protocol.

In one embodiment, the slot is a slot defined by the IEEE 802 series protocol.

In one embodiment, the slot is a frame defined by the IEEE 802 series protocol.

In one embodiment, the slot comprises 2 multicarrier symbols.

In one embodiment, the slot comprises 4 multicarrier symbols.

In one embodiment, the slot comprises 7 multicarrier symbols.

In one embodiment, the slot comprises 14 multicarrier symbols.

In one embodiment, the slot comprises a positive integral multiple of multicarrier symbols of 14.

In one embodiment, the first time window is a slot.

In one embodiment, the first time window is a span.

In one embodiment, the first time window is a Monitoring Occasion (MO).

In one embodiment, the first time window comprises at least one multicarrier symbol.

In one embodiment, the first time window comprises more than one slot.

In one embodiment, the first time window comprises more than one consecutive slot.

In one embodiment, the first time window comprises more than 14 multicarrier symbols.

In one embodiment, the first time length comprises a time length of at least one multicarrier symbol.

In one embodiment, the first time length comprises a time length of more than 14 multicarrier symbols.

In one embodiment, the first time length comprises a time length of at least one slot.

In one embodiment, the first time length comprises a time length of more than one slot.

In one embodiment, an expression in the present disclosure of "a time interval length of the first time-frequency resource set and the second time-frequency resource set in time domain" includes a time interval length between a start time of the first time-frequency resource set and a start time of the second time-frequency resource set.

In one embodiment, an expression in the present disclosure of "a time interval length of the first time-frequency resource set and the second time-frequency resource set in time domain" includes a time interval length between an end time of the first time-frequency resource set and a start time of the second time-frequency resource set.

In one embodiment, an expression in the present disclosure of "a time interval length of the first time-frequency resource set and the second time-frequency resource set in time domain" includes a time interval length between an end time of the first time-frequency resource set and an end time of the second time-frequency resource set.

In one embodiment, an expression in the present disclosure of "a time interval length of the first time-frequency resource set and the second time-frequency resource set in time domain" includes a time interval length between a start time of the first time-frequency resource set and an end time of the second time-frequency resource set.

In one embodiment, an expression in the present disclosure of "a time interval length of the first time-frequency resource set and the second time-frequency resource set in time domain" includes a time interval length between a start time of a slot where the first time-frequency resource set is located and a start time of a slot where the second time-frequency resource set is located.

In one embodiment, an expression in the present disclosure of "a time interval length of the first time-frequency resource set and the second time-frequency resource set in time domain" includes a time interval length between an end time of a slot where the first time-frequency resource set is located and an end time of a slot where the second time-frequency resource set is located.

In one embodiment, an expression in the present disclosure of "a time interval length of the first time-frequency resource set and the second time-frequency resource set in time domain" includes a time interval length between an end time of a slot where the first time-frequency resource set is located and a start time of a slot where the second time-frequency resource set is located.

In one embodiment, an expression in the present disclosure of "a time interval length of the first time-frequency resource set and the second time-frequency resource set in time domain" includes a time interval length between a start time of a slot where the first time-frequency resource set is located and an end time of a slot where the second time-frequency resource set is located.

In one embodiment, an expression in the present disclosure of "a time interval length of the first time-frequency resource set and the second time-frequency resource set in time domain" includes a time interval length between a start time of a first one of a plurality of slots where the first time-frequency resource set is located and a start time of a first one of a plurality of slots where the second time-frequency resource set is located.

In one embodiment, an expression in the present disclosure of "a time interval length of the first time-frequency resource set and the second time-frequency resource set in time domain" includes a time interval length between an end time of a last one of a plurality of slots where the first time-frequency resource set is located and an end time of a last one of a plurality of slots where the second time-frequency resource set is located.

In one embodiment, an expression in the present disclosure of "a time interval length of the first time-frequency resource set and the second time-frequency resource set in time domain" includes a time interval length between an end time of a last one of a plurality of slots where the first time-frequency resource set is located and a start time of a first one of a plurality of slots where the second time-frequency resource set is located.

In one embodiment, an expression in the present disclosure of "a time interval length of the first time-frequency resource set and the second time-frequency resource set in time domain" a time interval length between a start time of a first one of a plurality of slots where the first time-frequency resource set is located and an end time of a last one of a plurality of slots where the second time-frequency resource set is located.

In one embodiment, the end time of a time-frequency resource set comprises an end time of a last multicarrier symbol comprised in the time-frequency resource set.

In one embodiment, the start time of a time-frequency resource set comprises a start time symbol of a first multicarrier comprised in the time-frequency resource set.

In one embodiment, the end time of a slot where a time-frequency resource set is located comprises an end time of a last multicarrier symbol comprised in a slot where the time-frequency resource set is located.

In one embodiment, the start time of a slot where a time-frequency resource set is located comprises a start time symbol of a first multicarrier comprised in a slot where the time-frequency resource set is located.

In one embodiment, the end time of a slot where a time-frequency resource set is located comprises an end time of a last downlink multicarrier symbol comprised in a slot where the time-frequency resource set is located.

In one embodiment, the start time of a slot where a time-frequency resource set is located comprises a start time symbol of a first downlink multicarrier comprised in a slot where the time-frequency resource set is located.

In one embodiment, the end time of a slot where a time-frequency resource set is located comprises an end time of a last non-uplink multicarrier symbol comprised in a slot where the time-frequency resource set is located.

In one embodiment, the start time of a slot where a time-frequency resource set is located comprises a start time symbol of a first non-uplink multicarrier comprised in a slot where the time-frequency resource set is located.

In one embodiment, the time-frequency resource set comprises one of the first time-frequency resource set, the second time-frequency resource set, the third time-frequency resource set and the fourth time-frequency resource set.

In one embodiment, the multicarrier symbol comprises an Orthogonal Frequency Divided Multiplexing (OFDM) symbol.

In one embodiment, the multicarrier symbol comprises a Discreteed Fourier Transform-spreading-Orthogonal Frequency Divided Multiplexing (DFT-s-OFDM) symbol.

In one embodiment, the multicarrier symbol comprises a Single Carrier-Frequency Divided Multiple Access (SC-FDMA) symbol.

In one embodiment, the first control channel candidate set and the second control channel candidate set are associated with Q2 non-overlapped CCEs, Q2 being an integer greater than 1; Q2 is not greater than a maximum non-overlapped CCE number; and the first time length and a time length of the first time window are used together to determine the maximum non-overlapped CCE number.

In one embodiment, the first information block indicates a fourth control channel candidate set, and the fourth control channel candidate set comprises at least one control channel candidate; the fourth control channel candidate set is associated with a fourth time-frequency resource set, a start time of the fourth time-frequency resource set is later than an end time of the first time-frequency resource set, and the fourth time-frequency resource set is located in the first time window in time domain; the first control channel candidate set, the second control channel candidate set and the fourth control channel candidate set comprise Q3 control channel candidates in total, Q3 being an integer greater than 1; when Q3 is greater than the maximum monitoring number, the first receiver does not monitor the fourth control channel candidate set; and when Q3 is not greater than the maximum monitoring number, the first receiver monitors the fourth control channel candidate set.

In one subembodiment of the above embodiment, an index of a search space set to which any control channel candidate in the fourth control channel candidate set belongs is greater than an index of a search space set to which any control channel candidate in the first control channel candidate set belongs.

In one subembodiment of the above embodiment, an index of a search space set to which any control channel candidate in the fourth control channel candidate set belongs is less than an index of a search space set to which any control channel candidate in the first control channel candidate set belongs.

In one embodiment, the fourth time-frequency resource set comprises at least one RE in frequency domain.

In one embodiment, the fourth time-frequency resource set comprises at least one RB in frequency domain.

In one embodiment, the fourth time-frequency resource set comprises at least one RBG in frequency domain.

In one embodiment, the fourth time-frequency resource set comprises at least one CCE in frequency domain.

In one embodiment, the fourth time-frequency resource set comprises at least one multicarrier symbol in time domain.

In one embodiment, the fourth time-frequency resource set comprises at least one slot in time domain.

In one embodiment, the fourth time-frequency resource set comprises at least one sub-frame in time domain.

In one embodiment, the fourth time-frequency resource set comprises a plurality of consecutive multicarrier symbols in time domain.

In one embodiment, the fourth time-frequency resource set comprises a plurality of consecutive slots in time domain.

In one embodiment, the fourth time-frequency resource set comprises a plurality of consecutive resource blocks in frequency domain.

In one embodiment, the fourth time-frequency resource set comprises a plurality of inconsecutive resource blocks in frequency domain.

In one embodiment, the fourth time-frequency resource set comprises time-frequency resources comprised in a CORESET.

In one embodiment, the fourth time-frequency resource set comprises time-frequency resources comprised in a plurality of CORESETs.

In one embodiment, the fourth time-frequency resource set comprises time-frequency resources comprised in a plurality of CORESETs, and time-frequency resources comprised in the plurality of CORESETs are located in a same slot in time domain.

In one embodiment, the fourth time-frequency resource set comprises time-frequency resources comprised in a plurality of CORESETs, and time-frequency resources comprised in the plurality of CORESETs are located in consecutive plurality of slots in time domain.

In one embodiment, the fourth time-frequency resource set and the first time-frequency resource set are the same.

In one embodiment, the fourth time-frequency resource set and the first time-frequency resource set are different.

Embodiment 7

Figure 7:
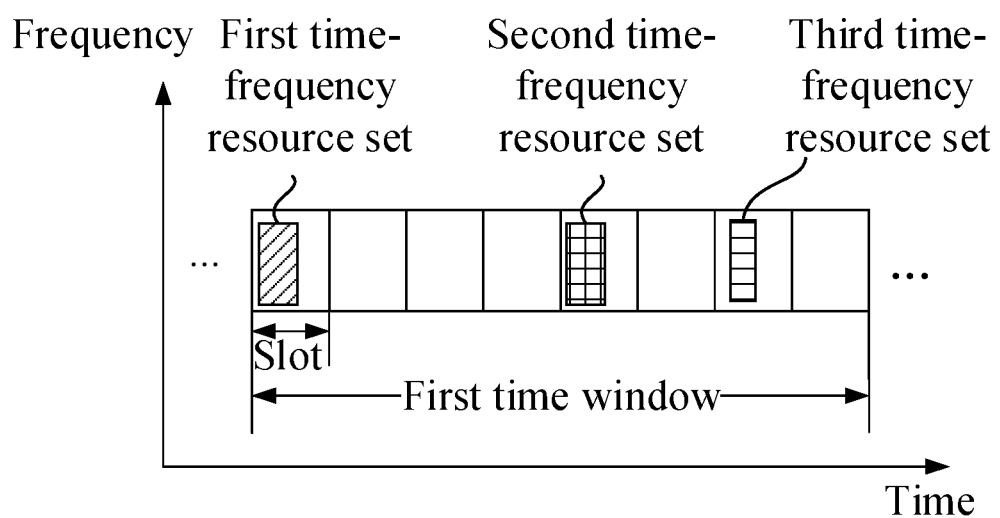
FIG. 7 illustrates a schematic diagram of time-frequency resources respectively comprised in a first time-frequency resource set, a second time-frequency resource set and a third time-frequency resource set according to one embodiment of the present disclosure.

Embodiment 7 illustrates a schematic diagram of time-frequency resources respectively comprised in a first time-frequency resource set, a second time-frequency resource set and a third time-frequency resource set according to one embodiment of the present disclosure, as shown in FIG. 7. In FIG. 7, the unfilled rectangle represents a time length of a slot, a section of frequency resources in frequency domain, the slash-filled rectangle represents time-frequency resources occupied by a first time-frequency resource set, the grid-filled rectangle represents time-frequency resources occupied by a second time-frequency resource set, and horizontal line-filled rectangle represents time-frequency resources occupied by a third time-frequency resource set. In FIG. 7, size and position of the rectangle are only for illustration instead of representing size of an actual resources and that occupation of resources is continuous. In embodiment 7, a first time window comprises a time length of 8 consecutive slots, the first time-frequency resource set is located in a first slot of the first time window in time domain, the second time-frequency resource set is located in a fifth slot in the first time window in time domain, and the third time-frequency resource set is located in 7-th slot in the first time window.

In one embodiment, the fourth information block indicates a third control channel candidate set, and the third control channel candidate set comprises at least one control channel candidate; time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

In one embodiment, the fourth information block is transmitted via an air interface.

In one embodiment, the fourth information block is transmitted via a radio interface.

In one embodiment, the fourth information block comprises all or part of a higher-layer signaling.

In one embodiment, the fourth information block comprises all or part of a physical-layer signaling.

In one embodiment, the fourth information block comprises all or part of an RRC signaling.

In one embodiment, the fourth information block comprises all or part of a MAC layer signaling.

In one embodiment, the fourth information block comprises all or part of an SIB.

In one embodiment, the fourth information block is Cell-specific.

In one embodiment, the fourth information block is UE-specific.

In one embodiment, the fourth information block is Per Serving Cell configured.

In one embodiment, the fourth information block comprises all or partial fields of a DCI signaling.

In one embodiment, the fourth information block comprises more than one sub-information block, and each sub-information block comprised in the fourth information block is an IE or a field in an RRC signaling to which the fourth information block belongs; a sub-information block comprised in the fourth information block is used to indicate the third control channel candidate set.

In one embodiment, the fourth information block comprises all or partial fields in an IE "BWP-Downlink" in an RRC signaling.

In one embodiment, the fourth information block comprises all or partial fields in an IE "BWP-DownlinkDedicated" in an RRC signaling.

In one embodiment, the fourth information block comprises all or partial fields in an IE "PDCCH-Config" in an RRC signaling.

In one embodiment, the fourth information block comprises all or partial fields in an IE "ControlResourceSet" in an RRC signaling.

In one embodiment, the fourth information block comprises all or partial fields in an IE "SearchSpace" in an RRC signaling.

In one embodiment, the fourth information block comprises a field "searchSpacesToAddModList" in an RRC signaling.

In one embodiment, an expression of "a fourth information block indicating a third control channel candidate set" in the claim includes the following meaning: the fourth information block is used to indicate at least one search space set, any search space set in the at least one search space set comprises at least one control channel candidate, and the third control channel candidate set comprises the at least one search space set.

In one embodiment, an expression of "a fourth information block indicating a third control channel candidate set" in the claim includes the following meaning: the fourth information block is used to indicate a CORESET associated with at least one search space set comprised in a third control channel candidate set.

In one embodiment, the fourth information block comprises a third field, the third field is a field comprised in an IE "SearchSpace" in an RRC signaling, and the third field indicates a search space ID.

In one embodiment, the fourth information block comprises a third field, the third field is a field comprised in an IE "SearchSpace" in an RRC signaling, and the third field indicates a CORESET ID.

In one embodiment, the fourth information block comprises a third field, the third field is a field comprised in an IE in an RRC signaling, and the third field indicates a plurality of search space IDs.

In one embodiment, an expression of "a fourth information block indicating a third control channel candidate set" in the claim includes the following meaning: the fourth information block comprises a third field, the third field is a field comprised in an IE in an RRC signaling, and the third field indicates a search space ID; the third control channel candidate set comprises a search space set represented by the search space ID indicated by the third field.

In one embodiment, the fourth information block is used to configure a CSS set.

In one embodiment, the fourth information block is the same as the second information block.

In one embodiment, the second information block and the fourth information block respectively belong to two different RRC layer signalings.

In one embodiment, the second information block and the fourth information block respectively belong to two different IEs comprised in a same RRC layer signaling.

In one embodiment, the second information block and the fourth information block belong to a same RRC layer signaling, and a field comprised in the first information block and a field comprised in the fourth information block are different.

In one embodiment, the second information block and the fourth information block are transmitted at the same time.

In one embodiment, the second information block is earlier than the fourth information block.

In one embodiment, the second information block is later than the fourth information block.

In one embodiment, the third time-frequency resource set comprises at least one RE in frequency domain.

In one embodiment, the third time-frequency resource set comprises at least one RB in frequency domain.

In one embodiment, the third time-frequency resource set comprises at least one RBG in frequency domain.

In one embodiment, the third time-frequency resource set comprises at least one CCE in frequency domain.

In one embodiment, the third time-frequency resource set comprises at least one multicarrier symbol in time domain.

In one embodiment, the third time-frequency resource set comprises at least one slot in time domain.

In one embodiment, the third time-frequency resource set comprises at least one sub-frame in time domain.

In one embodiment, the third time-frequency resource set comprises a plurality of consecutive multicarrier symbols in time domain.

In one embodiment, the third time-frequency resource set comprises a plurality of consecutive resource blocks in frequency domain.

In one embodiment, the third time-frequency resource set comprises a plurality of inconsecutive resource blocks in frequency domain.

In one embodiment, the third time-frequency resource set comprises time-frequency resources comprised in a CORESET.

In one embodiment, the third time-frequency resource set comprises time-frequency resources comprised in a plurality of CORESETs.

In one embodiment, the third time-frequency resource set comprises time-frequency resources comprised in a plurality of CORESETs, and time-frequency resources comprised in the plurality of CORESETs are located in a same slot in time domain.

In one embodiment, the third time-frequency resource set comprises time-frequency resources comprised in a plurality of CORESETs, and time-frequency resources comprised in the plurality of CORESETs are located in consecutive plurality of slots in time domain.

In one embodiment, the third time-frequency resource set comprises a slot in the first time window in time domain.

In one embodiment, the third time-frequency resource set comprises a slot other than a first slot in the first time window in time domain.

In one embodiment, the third time-frequency resource set comprises M1 consecutive slots in time domain in the first time window in time domain, M1 being an integer greater than 1.

In one embodiment, the third time-frequency resource set comprises M1 consecutive slots in time domain other than a first slot in the first time window in time domain, M1 being an integer greater than 1.

In one embodiment, the third time-frequency resource set comprises M1 consecutive slots in time domain other than first M2 slots in the first time window in time domain, M1 and M2 being integers greater than 1.

In one embodiment, the third time-frequency resource set comprises frequency-domain resources occupied by all control channel candidates comprised in the third control channel candidate set in frequency domain.

In one embodiment, the third time-frequency resource set comprises time-domain resources occupied by all control channel candidates comprised in the third control channel candidate set in time domain.

In one embodiment, the third time-frequency resource set comprises multicarrier symbols occupied by all control channel candidates comprised in the third control channel candidate set in time domain.

In one embodiment, the third time-frequency resource set comprises a slot where all control channel candidates comprised in the third control channel candidate set in time domain are located.

In one embodiment, the second time length comprises a time length of at least one multicarrier symbol.

In one embodiment, the second time length comprises a time length of more than 14 multicarrier symbols.

In one embodiment, the second time length comprises a time length of at least one slot.

In one embodiment, the second time length comprises a time length of more than one slot.

In one embodiment, an expression in the present disclosure of "a time interval length of the first time-frequency resource set and the third time-frequency resource set in time domain" includes a time interval length between a start time of the first time-frequency resource set and a start time of the third time-frequency resource set.

In one embodiment, an expression in the present disclosure of "a time interval length of the first time-frequency resource set and the third time-frequency resource set in time domain" includes a time interval length between an end time of the first time-frequency resource set and a start time of the third time-frequency resource set.

In one embodiment, an expression in the present disclosure of "a time interval length of the first time-frequency resource set and the third time-frequency resource set in time domain" includes a time interval length between an end time of the first time-frequency resource set and an end time of the third time-frequency resource set.

In one embodiment, an expression in the present disclosure of "a time interval length of the first time-frequency resource set and the third time-frequency resource set in time domain" includes a time interval length between a start time of the first time-frequency resource set and an end time of the third time-frequency resource set.

In one embodiment, an expression in the present disclosure of "a time interval length of the first time-frequency resource set and the third time-frequency resource set in time domain" includes a time interval length between a start time of a slot where the first time-frequency resource set is located and a start time of a slot where the third time-frequency resource set is located.

In one embodiment, an expression in the present disclosure of "a time interval length of the first time-frequency resource set and the third time-frequency resource set in time domain" includes a time interval length between an end time of a slot where the first time-frequency resource set is located and an end time of a slot where the third time-frequency resource set is located.

In one embodiment, an expression in the present disclosure of "a time interval length of the first time-frequency resource set and the third time-frequency resource set in time domain" includes a time interval length between an end time of a slot where the first time-frequency resource set is located and a start time of a slot where the third time-frequency resource set is located.

In one embodiment, an expression in the present disclosure of "a time interval length of the first time-frequency resource set and the third time-frequency resource set in time domain" includes a time interval length between a start time of a slot where the first time-frequency resource set is located and an end time of a slot where the third time-frequency resource set is located.

In one embodiment, an expression in the present disclosure of "a time interval length of the first time-frequency resource set and the third time-frequency resource set in time domain" includes a time interval length between a start time of a first one of a plurality of slots where the first time-frequency resource set is located and a start time of a first one of a plurality of slots where the third time-frequency resource set is located.

In one embodiment, an expression in the present disclosure of "a time interval length of the first time-frequency resource set and the third time-frequency resource set in time domain" includes a time interval length between an end time of a last one of a plurality of slots where the first time-frequency resource set is located and an end time of a last one of a plurality of slots where the third time-frequency resource set is located.

In one embodiment, an expression in the present disclosure of "a time interval length of the first time-frequency resource set and the third time-frequency resource set in time domain" includes a time interval length between an end time of a last one of a plurality of slots where the first time-frequency resource set is located and a start time of a first one of a plurality of slots where the third time-frequency resource set is located.

In one embodiment, an expression in the present disclosure of "a time interval length of the first time-frequency resource set and the third time-frequency resource set in time domain" includes a time interval length between a start time of a first one of a plurality of slots where the first time-frequency resource set is located and an end time of a last one of a plurality of slots where the third time-frequency resource set is located.

In one embodiment, a start time of the first time-frequency resource set is earlier than a start time of the second time-frequency resource set.

In one embodiment, an end time of the first time-frequency resource set is earlier than a start time of the second time-frequency resource set.

In one embodiment, a start time of the first time-frequency resource set is earlier than a start time of the third time-frequency resource set.

In one embodiment, an end time of the first time-frequency resource set is earlier than a start time of the third time-frequency resource set.

In one embodiment, a start time of the second time-frequency resource set is earlier than a start time of the third time-frequency resource set.

In one embodiment, an end time of the second time-frequency resource set is earlier than a start time of the third time-frequency resource set.

In one embodiment, the second time length is not used to determine the maximum monitoring number.

Embodiment 8

Figure 8:
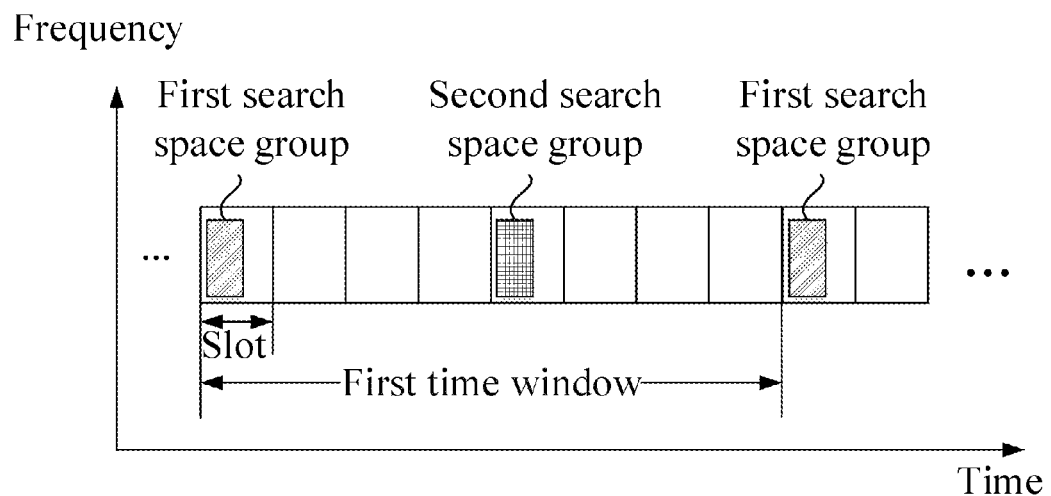
FIG. 8 illustrates a schematic diagram of time-frequency resources respectively comprised in a first search space group and a second search space group according to one embodiment of the present disclosure.

Embodiment 8 illustrates a schematic diagram of time-frequency resources respectively comprised in a first search space group and a second search space group according to one embodiment of the present disclosure, as shown in FIG. 8. In FIG. 8, the unfilled rectangle represents a time length of a slot in time domain, and a section of frequency resources in frequency domain, the two slash-filled rectangles represent time-frequency resources occupied by all control channel candidates respectively comprised by a first search space group in two control channel monitoring occasions, and the grid-filled rectangle represents time-frequency resources occupied by all control channel candidates comprised by a second search space group in a control channel monitoring occasion. In FIG. 8, size and position of the rectangle are only for illustration instead of representing size of actual resources and that occupation of resources is continuous. In embodiment 8, a first time window comprises a time length of eight consecutive slots, time-frequency resources occupied by all control channel candidates comprised by the first search space group in a first control channel monitoring occasion are located in a first slot of the first time window in time domain, time-frequency resources occupied by all control channel candidates comprised by the first search space group in a second control channel monitoring occasion are located in a first slot after the first time window, and time-frequency resources occupied by all control channel candidates comprised in the second search space group are located in a fifth slot in the time window in time domain.

In one embodiment, the control channel monitoring occasion is a PDCCH monitoring occasion.

In one embodiment, the control channel monitoring occasion is a PSCCH monitoring occasion.

In one embodiment, the control channel monitoring occasion is within at least one consecutive multicarrier symbol in time domain.

In one embodiment, the control channel monitoring occasion is within a slot.

In one embodiment, the control channel monitoring occasion is within consecutive plurality of slots.

In one embodiment, the control channel monitoring occasion is within a first time window.

In one embodiment, the first information block and the second information block respectively indicate a first search space group and a second search space group, the first search space group is used to determine the first control channel candidate set, and the second search space group is used to determine the second control channel candidate set.

In one embodiment, the first search space group is associated with a first control channel monitoring period, and the first control channel monitoring is not less than a time length of the first time window.

In one embodiment, the first search space group is used to determine a plurality of control channel monitoring occasions, and a time interval between any two the control channel monitoring occasions adjacent in time in the plurality of control channel monitoring occasions is not less than a time length of the first time window.

In one embodiment, the first search space group is used to determine a plurality of control channel monitoring occasions, when a time interval between any two the control channel monitoring occasions adjacent in time in the plurality of control channel monitoring occasions is less than a time length of the first time window, a latter one of the any two the control channel monitoring occasions adjacent in time is not monitored.

In one embodiment, any control channel candidate comprised in the first control channel candidate set belongs to the first search space group.

In one embodiment, the first search space group comprises at least one search space set.

In one embodiment, any control channel candidate comprised in the first control channel candidate set belongs to a search space set in the at least one search space set in the first search space group.

In one embodiment, the first search space group comprises at least one common search space (CSS) set.

In one embodiment, the first search space group comprises at least one USS set.

In one embodiment, the first information block is used to indicate the first search space group.

In one embodiment, any control channel candidate comprised in the second control channel candidate set belongs to the second search space group.

In one embodiment, the second search space group comprises at least one search space set.

In one embodiment, any control channel candidate comprised in the second control channel candidate set belongs to a search space set in the at least one search space set in the second search space group.

In one embodiment, the second search space group comprises at least one CSS set.

In one embodiment, the second search space group comprises at least one USS set.

In one embodiment, the second search space group only comprises a CSS set.

In one embodiment, the second search space group only comprises a USS set.

In one embodiment, the second search space group does not comprise a USS set.

In one embodiment, a monitoring period of any search space set in the first search space group is not less than a time length of the first time window.

In one embodiment, the first node assumes that a monitoring period of any search space set in the first search space group is not less than a time length of the first time window.

In one embodiment, a monitoring period of any search space set in the first search space group is used to determine a time length of the first time window.

In one embodiment, a monitoring period of all search space sets in the first search space group is used to determine a time length of the first time window.

In one embodiment, a minimum monitoring period in monitoring periods of all search space sets in the first search space group is used to determine a time length of the first time window.

In one embodiment, a monitoring period of any search space set in the first search space group is used to determine a time length of the first time window out of the M2 time window length candidates.

In one embodiment, a monitoring period of all search space sets in the first search space group is used to determine a time length of the first time window out of the M2 time window length candidates.

In one embodiment, a minimum monitoring period in monitoring periods of all search space sets in the first search space group is used to determine a time length of the first time window out of the M2 time window length candidates.

In one embodiment, a minimum monitoring period in monitoring periods of all search space sets in the first search space group is not less than a time length of the first time window.

Embodiment 9

Embodiment 9 illustrates a schematic diagram of a first time length and a maximum monitoring number according to one embodiment of the present disclosure, as shown in FIG. 9. In FIG. 9, the first column on the left represents a first time length, the second column on the left represents a maximum monitoring number corresponding to a first time length on the first column, wherein L0, L1, L2 and L3 respectively represent four different values of a first time length, a0, a1, a2 and a3 respectively represent four predefined positive integers, and a0, a1, a2 and a3 are respectively associated with L0, L1, L2 and L3.

In embodiment 9, an association relation between a0, a1, a2, a3 and L0, L1, L2 and L3 is established under the condition of a given length of a first time window. When a time length of the first time window is one of the M2 time length candidates, for any of the M2 time window length candidates, there exists a table of an association relation between a maximum monitoring number and a first time length.

In one embodiment, the maximum monitoring number is determined by a table of a relation between the first time length and the maximum monitoring number.

In one embodiment, for any of the M2 time window length candidates, a value of the maximum monitoring number is determined by a table of a relation between the first time length and the maximum monitoring number.

In one embodiment, a value of the maximum monitoring number is one of 20, 22, 36 and 44.

In one embodiment, a value of the maximum monitoring number is one of 28, 30, 44 and 52.

In one embodiment, a value of the maximum monitoring number is one of 36, 38, 52 and 60.

In one embodiment, the maximum monitoring number is determined by a function of the first time length and the maximum monitoring number.

In one subembodiment of the above embodiment, the function of the first time length and the maximum monitoring number comprises $Yi=C1+F1*Li$, where Li represents a value of the first time length, Yi represents a value of the maximum monitoring number associated with Li, C1 represents an integer, and F1 represents a non-zero integer.

In one subembodiment of the above embodiment, the function of the first time length and the maximum monitoring number comprises $Yi=\text{floor}(C1+F1*Li)$, where Li represents a value of the first time length, Yi represents a value of the maximum monitoring number associated with Li, C1 represents an integer, and F1 represents a non-zero real number, and floor( ) represents an operation of being rounded down to an integer.

In one subembodiment of the above embodiment, the function of the first time length and the maximum monitoring number comprises $Yi=\text{ceil}(C1+F1*Li)$, where Li represents a value of the first time length, Yi represents a value of the maximum monitoring number associated with Li, C1 represents an integer, and F1 represents a non-zero real number, and ceil( ) represents an operation of being rounded up to an integer.

In one subembodiment of the above embodiment, the function of the first time length and the maximum monitoring number comprises $Yi=\text{floor}[C1+G1*\exp(D1+F1*Li)]$, where Li represents a value of the first time length, Yi represents a value of the maximum monitoring number associated with Li, C1 represents an integer, D1 represents an integer, G1 represents a non-zero real number, F1 represents a non-zero real number, floor[ ] represents an operation of being rounded down to an integer, exp( ) represents an exponential function with E1 as the base, and E1 is a real number.

In one subembodiment of the above embodiment, the function of the first time length and the maximum monitoring number comprises $Yi=\text{ceil}[C1+G1*\exp(D1+F1*Li)]$, where Li represents a value of the first time length, Yi represents a value of the maximum monitoring number associated with Li, C1 represents an integer, D1 represents an integer, G1 represents a non-zero real number, F1 represents a non-zero real number, ceil[ ] represents an operation of being rounded up to an integer, exp( ) represents an exponential function with E1 as the base, and E1 is a real number.

In one subembodiment of the above embodiment, C1 is 0.

In one subembodiment of the above embodiment, C1 is a positive integer.

In one subembodiment of the above embodiment, D1 is 0.

In one subembodiment of the above embodiment, D1 is a positive integer.

In one subembodiment of the above embodiment, E1 is one of 2, 10, and natural constant e.

In one subembodiment of the above embodiment, F1 is a positive integer.

In one subembodiment of the above embodiment, G1 is a positive integer.

In one subembodiment of the above embodiment, G1 is 1.

In one subembodiment of the above embodiment, F1 is a real number not less than 1.

In one subembodiment of the above embodiment, at least one value of C1, D1, F1 or G1 is related to the first time window.

In one subembodiment of the above embodiment, a time length of the first time window is used to determine at least one value of C1, D1, F1 or G1.

In one subembodiment of the above embodiment, a time length of the first time window is one of the M2 time window length candidates, and any of the M2 time window length candidates is associated with a candidate value of one of C1, D1, F1 and G1.

In one subembodiment of the above embodiment, C1, D1, F1, and G1 are all unrelated to the first time window.

In one embodiment, an SCS of a subcarrier occupied by any of the Q1 control channel candidates in frequency domain is used to determine the maximum monitoring number.

Embodiment 10

Embodiment 10 illustrates a schematic diagram of a first time length and a second monitoring number component according to one embodiment of the present disclosure, as shown in FIG. 10. In FIG. 10, the first column on the left represents a first time length, the second column on the left represents a second monitoring number component respectively corresponding to a first time length on a first column, herein, L0, L1, L2, L3 respectively represent four different values of a first time length, b0, b1, b2 and b3 respectively represent four predefined positive integers, and b0, b1, b2, and b3 are respectively associated with L0, L1, L2 and L3.

In embodiment 10, an association relation between b0, b1, b2, b3 and L0, L1, L2 and L3 is established under the condition of a given length of a first time window. When a time length of the first time window is one of the M2 time length candidates, for any of the M2 time window length candidates, there exists a table of an association relation between a second monitoring number component and a first time length.

In one embodiment, the maximum monitoring number is equal to a sum of the first monitoring number component and the second monitoring number component.

In one embodiment, the first monitoring number component is unrelated to the first time length.

In one embodiment, the first monitoring number component is related to a time length of the first time length.

In one embodiment, any of the M2 time window length candidates is associated with a said first monitoring number component.

In one embodiment, a value of the first monitoring number component is one of 20, 22, 36 and 44.

In one embodiment, a value of the second monitoring number component is one of 4, 8, 16 and 32.

In one embodiment, the second monitoring number component is determined by a table of a relation between the first time length and the second monitoring number component.

In one embodiment, the second monitoring number component is determined by a function of the second monitoring number component and the first time length.

In one subembodiment of the above embodiment, the function of the second monitoring number component and the first time length comprises $Y_i = C_1 + F_1 * L_i$, where $L_i$ represents a value of the first time length, $Y_i$ represents a value of the second monitoring number associated with $L_i$, $C_1$ represents an integer, and $F_1$ represents a non-zero integer.

In one subembodiment of the above embodiment, the function of the first time length and the second monitoring number component comprises $Y_i = \text{floor}(C_1 + F_1 * L_i)$, where $L_i$ represents a value of the first time length, $Y_i$ represents a value of the second monitoring number component associated with $L_i$, $C_1$ represents an integer, $F_1$ represents a non-zero real number, and floor( ) represents an operation of being rounded down to an integer.

In one subembodiment of the above embodiment, the function of the first time length and the second monitoring number component comprises $Y_i = \text{ceil}(C_1 + F_1 * L_i)$, where $L_i$ represents a value of the first time length, $Y_i$ represents a value of the second monitoring number component associated with $L_i$, $C_1$ represents an integer, and $F_1$ represents a non-zero real number, and ceil( ) represents an operation of being rounded up to an integer.

In one subembodiment of the above embodiment, the function of the first time length and the second monitoring number component comprises $Y_i = \text{floor}[C_1 + G_1 * \exp(D_1 + F_1 * L_i)]$, where $L_i$ represents a value of the first time length, $Y_i$ represents a value of the second monitoring number component associated with $L_i$, $C_1$ represents an integer, $D_1$ represents an integer, $G_1$ represents a non-zero real number, $F_1$ represents a non-zero real number, floor[ ] represents an operation of being rounded down to an integer, exp( ) represents an exponential function with $E_1$ as the base, and $E_1$ is a real number.

In one subembodiment of the above embodiment, the function of the first time length and the second monitoring number component comprises $Y_i = \text{ceil}[C_1 + G_1 * \exp(D_1 + F_1 * L_i)]$, where $L_i$ represents a value of the first time length, $Y_i$ represents a value of the second monitoring number component associated with $L_i$, $C_1$ represents an integer, $D_1$ represents an integer, $G_1$ represents a non-zero real number, $F_1$ represents a non-zero real number, ceil[ ] represents an operation of being rounded up to an integer, exp( ) represents an exponential function with $E_1$ as the base, and $E_1$ is a real number.

In one subembodiment of the above embodiment, $C_1$ is 0.

In one subembodiment of the above embodiment, $C_1$ is a positive integer.

In one subembodiment of the above embodiment, $D_1$ is 0.

In one subembodiment of the above embodiment, $D_1$ is a positive integer.

In one subembodiment of the above embodiment, $E_1$ is one of 2, 10, and natural constant e.

In one subembodiment of the above embodiment, $F_1$ is a positive integer.

In one subembodiment of the above embodiment, $G_1$ is a positive integer.

In one subembodiment of the above embodiment, $G_1$ is 1.

In one subembodiment of the above embodiment, $F_1$ is a real number not less than 1.

In one subembodiment of the above embodiment, at least one value of $C_1$, $D_1$, $F_1$ or $G_1$ is related to the first time window.

In one subembodiment of the above embodiment, a time length of the first time window is used to determine at least one value of $C_1$, $D_1$, $F_1$ or $G_1$.

In one subembodiment of the above embodiment, a time length of the first time window is one of the M2 time window length candidates, and any of the M2 time window length candidates is associated with a candidate value of one of $C_1$, $D_1$, $F_1$ and $G_1$.

In one subembodiment of the above embodiment, $C_1$, $D_1$, $F_1$, and $G_1$ are all unrelated to the first time window.

In one embodiment, an SCS of a subcarrier occupied by any of the Q1 control channel candidates in frequency domain is used to determine the second monitoring number component.

In one embodiment, a number of control channel candidates simultaneously belonging to the first control channel candidate set and the Q1 control channel candidates is not greater than the first monitoring number component.

In one embodiment, a number of control channel candidates in the second control channel candidate set belonging to the Q1 control channel candidates is not greater than the second monitoring number component.

In one embodiment, a number of control channel candidates in the second control channel candidate set belonging to the Q1 control channel candidates is greater than the second monitoring number component.

In one embodiment, a number of control channel candidates comprised in the first control channel candidate set and the second control channel candidate set is greater than Q1.

In one embodiment, when a number of control channel candidates comprised in the second control channel candidate set is greater than the second monitoring number component, and a number of control channel candidates in the first control channel candidate set belonging to the Q1 control channel candidates is not greater than a difference value between the maximum monitoring number and the number of control channel candidates comprised in the second control channel candidate set.

In one embodiment, when a number of control channel candidates comprised in the second control channel candidate set is greater than the second monitoring number component, all control channel candidates comprised in the second control channel candidate set belong to the Q1 control channel candidates.

In one embodiment, when a number of control channel candidates comprised in the second control channel candidate set is greater than the second monitoring number component and a number of control channel candidates comprised in the first control channel candidate set and the second control channel candidate set in total is not greater than the maximum monitoring number, all control channel candidates comprised in the second control channel candidate set belong to the Q1 control channel candidates.

In one embodiment, when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

In one embodiment, a control channel candidate in the first control channel candidate set belonging to the Q1 control channel candidates not is not monitored.

In one embodiment, when a number of control channel candidates comprised in the second control channel candidate set is not greater than the second monitoring number component, a remaining monitoring number in the second monitoring number component is not used to determine a number of control channel candidates in the first control channel candidate set belonging to the Q1 control channel candidates.

In one embodiment, a blind monitoring number represented by the second monitoring number component is only used for a blind detection of the control channel candidate not located in a first slot of the first time window.

In one embodiment, a blind monitoring number represented by the second monitoring number component is only used for a blind detection of the control channel candidate not located in first M3 slots of the first time window, M3 being a positive integer greater than 1.

In one embodiment, a blind monitoring number represented by the second monitoring number component is only used for a blind detection of the control channel candidate belonging to a CSS set not located in a first slot of the first time window.

In one embodiment, a blind monitoring number represented by the second monitoring number component is only used for a blind detection of the control channel candidate belonging to a CSS set not located in first M3 slots of the first time window, M3 being a positive integer greater than 1.

In one embodiment, a blind monitoring number represented by the second monitoring number component is not used for a blind detection of the control channel candidate located in a first slot of the first time window.

In one embodiment, a blind monitoring number represented by the second monitoring number component is not used for a blind detection of the control channel candidate located in first M3 slots of the first time window, M3 being a positive integer greater than 1.

In one embodiment, a blind monitoring number represented by the first monitoring number component is used for a blind detection of the control channel candidate located in a first slot of the first time window.

In one embodiment, a blind monitoring number represented by the first monitoring number component is used for a blind detection of the control channel candidate located in first M3 slots of the first time window, M3 being a positive integer greater than 1.

In one embodiment, a blind monitoring number represented by the first monitoring number component is used for a blind detection of the control channel candidate belonging to a CSS set not located in a first slot of the first time window.

In one embodiment, a blind monitoring number represented by the first monitoring number component is used for a blind detection of the control channel candidate belonging to a CSS set not located in first M3 slots of the first time window, M3 being a positive integer greater than 1.

In one embodiment, a blind monitoring number represented by the first monitoring number component is used for a blind detection of the control channel candidate located in any slot in the first time window.

Embodiment 11

Embodiment 11 illustrates the structure diagram of a processing device in a first node, as shown in FIG. 11. In FIG. 11, a processing device 1100 in a first node comprises a first receiver 1101.

In one embodiment, the first receiver 1101 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In embodiment 11, the first receiver 1101 receives a first information block and a second information block, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and the first receiver 1101 monitors Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the first node also comprises a first transmitter.

In one embodiment, the first transmitter comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the first node 1100 is a UE.

In one embodiment, the first node 1100 is a relay node.

In one embodiment, the first node 1100 is a base station.

In one embodiment, the first node 1100 is a vehicle-mounted communication device.

In one embodiment, the first node 1100 is a UE that supports V2X communications.

In one embodiment, the first node 1100 is a relay node that supports V2X communications.

In one embodiment, the first node 1100 is a base station that supports IAB.

Embodiment 12

Embodiment 12 illustrates the structure diagram of a processing device in a second node, as shown in FIG. 12. In FIG. 12, a processing device 1200 in a second node comprises a second transmitter 1201.

In one embodiment, the second transmitter 1201 comprises at least one of the antenna 420, the transmitter/receiver 418, the multi-antenna transmitting processor 471, the transmitting processor 416, the controller/processor 475 or the memory 476 in FIG. 4 of the present disclosure.

In embodiment 12, the second transmitter 1201 transmits a first information block and a second information block, the first information block is used to indicate a first control channel candidate set, and the second information block is used to indicate a second control channel candidate set; the first control channel candidate set comprises at least one control channel candidate; the second control channel candidate set comprises at least one control channel candidate; time-frequency resources occupied by any control channel candidate comprised in the first control channel candidate set belong to a first time-frequency resource set, and time-frequency resources occupied by any control channel candidate comprised in the second control channel candidate set belong to a second time-frequency resource set; and the second transmitter 1201 determines Q1 control channel candidates, Q1 being an integer greater than 1; herein, time-frequency resources comprised in the first time-frequency resource set belong to a first time window in time domain, a length of a time interval between the first time-frequency resource set and the second time-frequency resource set in time domain is equal to a first time length, the first time length is less than a time length of the first time window, and a time length of the first time window is greater than a time length of a slot; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

In one embodiment, the maximum monitoring number comprises a first monitoring number component and a second monitoring number component, the first monitoring number component is unrelated to the first time length, and the first time length is used to determine the second monitoring number component.

In one embodiment, the second node 1200 also comprises a second receiver, the second receiver receives a third information block; herein, the third information block is used to determine that a transmitting node of the third information block has a capability to determine the maximum monitoring number according to both the first time length and a time length of the first time window.

In one embodiment, the third information block is used to determine a plurality of monitoring capability candidates supported by a transmitting node of the third information block, and the second monitoring number component is one of the plurality of monitoring capability candidates.

In one embodiment, when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

In one embodiment, any control channel candidate in the second control channel candidate set belongs to a CSS set.

In one embodiment, the second transmitter 1201 transmits a fourth information block, the fourth information block indicates a third control channel candidate set, and the third control channel candidate set comprises at least one control channel candidate; time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

In one embodiment, the second node also comprises a second receiver.

In one embodiment, the second receiver comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second node 1200 is a UE.

In one embodiment, the second node 1200 is a relay node.

In one embodiment, the second node 1200 is a base station.

In one embodiment, the second node 1200 is a vehicle-mounted communication device.

In one embodiment, the second node 1200 is a UE that supports V2X communications.

In one embodiment, the second node 1200 is a relay node that supports V2X communications.

In one embodiment, the second node 1200 is a base station that supports IAB.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and
the first receiver, monitoring Q1 control channel candidates, Q1 being an integer greater than 1;
wherein time-frequency resources comprised in the first time-frequency resource set belong to a first time window in time domain, a length of a time interval between a start time of a slot where the first time-frequency resource set is located and an end time of a slot where the second time-frequency resource set is located is equal to a first time length, the first time length comprises a time length of at least one slot, the first time length is less than a time length of the first time window, and a time length of the first time window is greater than a time length of a slot, the first time window comprises multiple consecutive slots; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

2. The first node according to claim 1, wherein the maximum monitoring number comprises a first monitoring number component and a second monitoring number component, the first monitoring number component is unrelated to the first time length, and the first time length is used to determine the second monitoring number component.

3. The first node according to claim 1, comprising:
the first transmitter transmitting a third information block;
wherein the third information block is used to determine that the first node has a capability to determine the maximum monitoring number according to both the first time length and a time length of the first time window.

4. The first node according to claim 3, wherein the third information block is used to determine a plurality of monitoring capability candidates supported by the first node, and the second monitoring number component is one of the plurality of monitoring capability candidates.

5. The first node according to claim 2, wherein when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

6. The first node according to claim 1, wherein any control channel candidate in the second control channel candidate set belongs to a common search space set.

7. The first node according to claim 1, wherein the first receiver receives a fourth information block;
wherein the fourth information block indicates a third control channel candidate set, and the third control channel candidate set comprises at least one control channel candidate; time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

8. A second node for wireless communications, comprising:
a second transmitter, transmitting a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and
the second transmitter, determining Q1 control channel candidates, Q1 being an integer greater than 1;
wherein time-frequency resources comprised in the first time-frequency resource set belong to a first time window in time domain, a length of a time interval between a start time of a slot where the first time-frequency resource set is located and an end time of a slot where the second time-frequency resource set is located is equal to a first time length, the first time length comprises a time length of at least one slot, the first time length is less than a time length of the first time window, and a time length of the first time window is greater than a time length of a slot, the first time window comprises multiple consecutive slots; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

9. The second node according to claim 8, wherein the maximum monitoring number comprises a first monitoring number component and a second monitoring number component, the first monitoring number component is unrelated to the first time length, and the first time length is used to determine the second monitoring number component.

10. The second node according to claim 8, comprising:
a second receiver, receiving a third information block;
wherein the third information block is used to determine that a transmitting node of the third information block has a capability to determine the maximum monitoring number according to both the first time length and a time length of the first time window.

11. The second node according to claim 9, wherein when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

12. The second node according to claim 8, wherein any control channel candidate in the second control channel candidate set belongs to a common search space set.

13. The second node according to claim 8, wherein the second transmitter transmits a fourth information block, the fourth information block indicates a third control channel candidate set, and the third control channel candidate set comprises at least one control channel candidate;
time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

14. A method in a first node for wireless communications, comprising:
receiving a first information block and a second information block, the first information block being used to indicate a first control channel candidate set, and the second information block being used to indicate a second control channel candidate set; the first control channel candidate set comprising at least one control channel candidate; the second control channel candidate set comprising at least one control channel candidate; time-frequency resources occupied by any control channel candidate comprised in the first control channel candidate set belonging to a first time-frequency resource set, and time-frequency resources occupied by any control channel candidate comprised in the second control channel candidate set belonging to a second time-frequency resource set; and
monitoring Q1 control channel candidates, Q1 being an integer greater than 1;
wherein time-frequency resources comprised in the first time-frequency resource set belong to a first time window in time domain, a length of a time interval between a start time of a slot where the first time-frequency resource set is located and an end time of a slot where the second time-frequency resource set is located is equal to a first time length, the first time length comprises a time length of at least one slot, the first time length is less than a time length of the first time window, and a time length of the first time window is greater than a time length of a slot, the first time window comprises multiple consecutive slots; any of the Q1 control channel candidates belongs to one of the first control channel candidate set or the second control channel candidate set; Q1 is not greater than a maximum monitoring number, and the maximum monitoring number is a positive integer; the first time length and a time length of the first time window are used together to determine the maximum monitoring number.

15. The method in a second node according to claim 14, wherein the maximum monitoring number comprises a first monitoring number component and a second monitoring number component, the first monitoring number component is unrelated to the first time length, and the first time length is used to determine the second monitoring number component.

16. The method in a second node according to claim 14, comprising:
transmitting a third information block;
wherein the third information block is used to determine that the first node has a capability to determine the maximum monitoring number according to both the first time length and a time length of the first time window.

17. The method in a second node according to claim 16, wherein the third information block is used to determine a plurality of monitoring capability candidates supported by the first node, and the second monitoring number component is one of the plurality of monitoring capability candidates.

18. The method in a second node according to claim 15, wherein when a number of control channel candidates comprised in the second control channel candidate set is not greater than the second monitoring number component, a number of control channel candidates simultaneously belonging to the first control channel candidate set and the Q1 control channel candidates is not greater than the first monitoring number component.

19. The method in a second node according to claim 14, wherein any control channel candidate in the second control channel candidate set belongs to a common search space set.

20. The method in a second node according to claim 14, comprising:
receiving a fourth information block;
wherein the fourth information block indicates a third control channel candidate set, and the third control channel candidate set comprises at least one control channel candidate; time-frequency resources occupied by any control channel candidate comprised in the third control channel candidate set belong to a third time-frequency resource set; a length of a time interval between the first time-frequency resource set and the third time-frequency resource set in time domain is equal to a second time length, and the second time length is not less than the first time length.

* * * * *